(12) United States Patent
Yu et al.

(10) Patent No.: US 11,936,444 B2
(45) Date of Patent: Mar. 19, 2024

(54) FRAME EXCHANGE METHOD FOR BEAMFORMING

(71) Applicant: NEWRACOM, Inc., Lake Forest, CA (US)

(72) Inventors: Heejung Yu, Daejeon (KR); Yujin Noh, Irvine, CA (US); Jong-Ee Oh, Irvine, CA (US); Jaeyoung Ryu, Irvine, CA (US)

(73) Assignee: Newracom, Inc., Lake Forest, CA (US)

( * ) Notice: Subject to any disclaimer, the term of this patent is extended or adjusted under 35 U.S.C. 154(b) by 0 days.

(21) Appl. No.: 18/055,611

(22) Filed: Nov. 15, 2022

(65) Prior Publication Data

US 2023/0075472 A1 Mar. 9, 2023

Related U.S. Application Data

(63) Continuation of application No. 17/448,341, filed on Sep. 21, 2021, now Pat. No. 11,546,023.
(Continued)

(51) Int. Cl.
*H04B 7/0426* (2017.01)
*H04L 5/00* (2006.01)
(Continued)

(52) U.S. Cl.
CPC ........... *H04B 7/043* (2013.01); *H04L 5/0023* (2013.01); *H04L 5/0048* (2013.01); *H04L 69/22* (2013.01); *H04L 69/24* (2013.01)

(58) Field of Classification Search
CPC .... H04B 7/043; H04B 7/0632; H04B 7/0695; H04L 5/0023; H04L 5/0048; H04L 69/22; H04L 69/24
See application file for complete search history.

(56) References Cited

U.S. PATENT DOCUMENTS

| 2015/0085777 A1* | 3/2015 | Seok ................ H04W 52/0216 370/329 |
| 2015/0110046 A1 | 4/2015 | Merlin et al. |

(Continued)

OTHER PUBLICATIONS

IEEE 802.11-2016, "Part 11: Wireless LAN Medium Access Control (MAC) and Physical Layer (PHY) Specifications," Standard, Institute of Electrical and Electronics Engineers, Inc. (IEEE), Dec. 7, 2016, 3534 pages.
(Continued)

*Primary Examiner* — Vineeta S Panwalker
(74) *Attorney, Agent, or Firm* — Nutter McClennen & Fish LLP

(57) ABSTRACT

A method performed by a wireless device functioning as a beamformee station in a wireless network to perform a sounding procedure. The method includes wirelessly receiving a null data packet (NDP) announcement frame from a beamformer station, wherein the NDP announcement frame includes an indication of whether the beamformee station should acknowledge the NDP announcement frame and responsive to determining that the NDP announcement frame includes an indication that the beamformee station should acknowledge the NDP announcement frame, wirelessly transmitting an acknowledgement frame for the NDP announcement frame to the beamformer station.

20 Claims, 21 Drawing Sheets

Related U.S. Application Data

(60) Provisional application No. 63/084,499, filed on Sep. 28, 2020.

(51) Int. Cl.
  *H04L 69/22* (2022.01)
  *H04L 69/24* (2022.01)

(56) References Cited

U.S. PATENT DOCUMENTS

2017/0311325 A1* 10/2017 Cariou ................. H04B 7/0617
2021/0321293 A1  10/2021 Chen et al.
2021/0336752 A1  10/2021 Kwon et al.

OTHER PUBLICATIONS

IEEE P802.11ax/D6.1, "Draft Standard for Information technology—Telecommunications and information exchange between systems Local and metropolitan area networks—Specific requirements", Part 11: Wireless LAN Medium Access Control (MAC) and Physical Layer (PHY) Specifications, Amendment 1: Enhancements for High Efficiency WLAN, May 2020, 784 pages.

IEEE P802.11be/D1.0, "Draft Standard for Information technology—Telecommunications and information exchange between systems Local and metropolitan area networks—Specific requirements", Part 11: Wireless LAN Medium Access Control (MAC) and Physical Layer (PHY) Specifications, Amendment 8: Enhancements for extremely high throughput (EHT), May 2021, 635 pages.

IEEE Std 802.11a-1999(R2003): "Part 11: Wireless LAN Medium Access Control (MAC) and Physical Layer (PHY) Specifications, High-speed Physical Layer in the 5 GHz Band," IEEE Standard for Information technology—Telecommunications and information exchange between systems, Local and metropolitan area networks—Specific requirements, reaffirmed Jun. 12, 2003, copyright 1999, 91 pages.

IEEE Std 802.11ac-2013 "Part 11: Wireless LAN Medium Access Control (MAC) and Physical Layer (PHY) Specifications, Amendment 4: Enhancements for Very High Throughput for Operation in Bands below 6 GHz," IEEE Standard for Information technology—Telecommunicationsand information exchange between systems, Local and metropolitan area networks—Specific requirements, Dec. 18, 2013, 425 pages.

IEEE Std 802.11ah-2016, "Part 11: Wireless LAN Medium Access Control (MAC) and Physical Layer (PHY) Specifications, Amendment 2: Sub 1 GHz License Exempt Operation", IEEE Standard for Information technology—Telecommunications and information exchange between systems, Local and metropolitan area networks—Specific requirements, 2016, 594 pages.

IEEE Std 802.11g-2003: "Part 11: Wireless LAN Medium Access Control (MAC) and Physical Layer (PHY) Specifications, Amendment 4: Further Higher Data Rate Extension in the 2.4 GHz Band," IEEE Standard for Information technology—Telecommunications and information exchange between systems, Local and metropolitan area networks—Specific requirements, Jun. 27, 2003, 78 pages.

IEEE Std 802.11n-2009: "Part 11: Wireless LAN Medium Access Control (MAC) and Physical Layer (PHY) Specifications, Amendment 5: Enhancements for Higher Throughput," IEEE Standard for Information technology—Telecommunications and information exchange between systems, Local and metropolitan area networks—Specific requirements, Oct. 29, 2009, 536 pages.

IEEE Std P802.11bd/D1.1, Part 11: Wireless LAN Medium Access Control (MAC) and Physical Layer (PHY) Specifications, Amendment 5: Enhancements for Next Generation Vehicular Communication, IEEE Draft Standard for Information technology—Telecommunications and information exchange between systems, Local and metropolitan area networks—Specific requirements, Dec. 2020, 102 pages.

IEEE Std. 802.11b-1999: "Higher Speed Physical Layer (PHY) Extension in the 2.4 GHz Band," IEEE Standard for Information Technology, Telecommunications and information exchange between systems, Local and Metropolitan networks, Specific requirements, Part 11: Wireless LAN Medium Access Control (MAC) and Physical Layer (PHY) specifications, Sep. 16, 1999, 96 pages.

Non-Final Office Action, U.S. Appl. No. 17/448,341, dated May 25, 2022, 7 pages.

Notice of Allowance, U.S. Appl. No. 17/448,341, dated Sep. 1, 2022, 5 pages.

* cited by examiner

| | MAXIMUM PHY RATE | PHY RATE ENHANCEMENT | BANDWIDTH/NUMBER OF SPATIAL STREAMS | OPERATING BANDS |
|---|---|---|---|---|
| IEEE 802.11B | 11 MBPS | - | 22 MHZ/1 SS | 2.4 GHZ |
| IEEE 802.11A/G | 54 MBPS | 5X | 2 MHZ/1 SS | 5 GHZ(A)/2.4 GHZ(G) |
| IEEE 802.11N | 600 MBPS | 11X | 40 MHZ/4 SS | 2.4/5 GHZ |
| IEEE 802.11AC | 6.9 GBPS | 11X | 160 MHZ/8 SS | 5 GHZ |
| IEEE 802.11AX | 9.6 GBPS | 1.4X | 160 MHZ/8 SS | 2.4/5 GHZ |
| IEEE 802.11BE | A GBPS | BX | 320 MHZ/16 SS | 2.4/5/6 GHZ |

FIG. 6

| ELEMENT/FIELD | DEFINITION 702 | DURATION 704 | DFT PERIOD 706 | GUARD INTERVAL (GI) 708 | SUBCARRIER SPACING 710 |
|---|---|---|---|---|---|
| LEGACY-SHORT TRAINING FIELD (L-STF) 712 | NON-HIGH THROUGHPUT(HT) SHORT TRAINING FIELD (STF) | 8 μs | - | - | equivalent to 1,250 kHz |
| LEGACY-LONG TRAINING FIELD (L-LTF) 714 | NON-HT LONG TRAINING FIELD (LTF) | 8 μs | 3.2 μs | 1.6 μs | 312.5 kHz |
| LEGACY-SIGNAL FIELD (L-SIG) 716 | NON-HT SIGNAL FIELD | 4 μs | 3.2 μs | 0.8 μs | 312.5 kHz |
| RL-SIG FIELD 718 | REPEATED NON-HT SIGNAL FIELD | 4 μs | 3.2 μs | 0.8 μs | 312.5 kHz |
| U-SIG FIELD 720 | UNIVERSAL SIGNAL FIELD | $N_{USIG} * 4$ μs | 3.2 μs | 0.8 μs | 312.5 kHz |
| EHT-SIG FIELD 722 | EHT SIGNAL FIELD | $N_{EHESIG} * 4$ μs | 3.2 μs | 0.8 μs | 312.5 kHz |
| EHT-HARQ FIELD 724 | EHT HARQ FIELD | - | - | - | - |
| EHT-STF 726 | EHT SHORT TRAINING FIELD | - | - | - | - |
| EHT-LTF 728 | EHT LONG TRAINING FIELD | $N_{EHTLTF} *$ (DTF period + GI) μs | 2xLTF: 6.4 μs; 4xLTF: 12.8 μs | 0.8, 1.6, or 3.2 μs | 2xLTF: (equivalent to) 156.25 kHz; 4xLTF: 78.125 kHz |
| EHT-DATA FIELD 730 | EHT DATA FIELD | $N_{DATA} *$ (DTF period + GI) μs | 12.8 μs | 0.8, 1.6, or 3.2 μs | 78.125 kHz |
| EHT-MA FIELD 732 | EHT MIDAMBLE FIELD | - | - | - | - |

FIG. 7

B0 and B1 bit allocation and its meaning in the proposed sounding dialog token field format

| B0 (EHT) | B1 (HE) | Meaning |
|---|---|---|
| 0 | 0 | VHT NDP Announcement indication |
| 0 | 1 | HE NDP Announcement indication |
| 1 | 0 | NDP Announcement indication for 802.11az |
| 1 | 1 | EHT NDP Announcement indication |

GENERATE A NDP ANNOUNCEMENT FRAME, WHEREIN THE NDP ANNOUNCEMENT FRAME INCLUDES A SOUNDING DIALOG TOKEN FIELD, WHEREIN BIT B0 OF THE SOUNDING DIALOG TOKEN FIELD IS SET TO BINARY '1' AND BIT B1 OF THE SOUNDING DIALOG TOKEN FIELD IS SET TO BINARY '1' TO INDICATE THAT THE NDP ANNOUNCEMENT FRAME IS AN EXTREMELY HIGH THROUGHPUT (EHT) NDP ANNOUNCEMENT FRAME
2002

↓

WIRELESSLY TRANSMIT THE NDP ANNOUNCEMENT FRAME TO ONE OR MORE STATIONS THAT ARE TO FUNCTION AS BEAMFORMEES (TO INITIATE A SOUNDING PROCEDURE)
2004

WIRELESSLY RECEIVE A NDP ANNOUNCEMENT FRAME FROM A STATION THAT IS TO FUNCTION AS A BEAMFORMER (BEAMFORMER STATION)
2102

↓

PROCESS THE NDP ANNOUNCEMENT FRAME AS AN EXTREMELY HIGH THROUGHPUT (EHT) NDP ANNOUNCEMENT FRAME IN RESPONSE TO A DETERMINATION THAT BOTH BIT B0 AND BIT B1 OF A SOUNDING DIALOG TOKEN FIELD OF THE NDP ANNOUNCEMENT FRAME ARE SET TO BINARY '1'
2104

FIG. 21

```
                                                    ← 2700
┌─────────────────────────────────────────────────────────────────┐
│  WIRELESSLY RECEIVE A NDP ANNOUNCEMENT FRAME FROM A STATIONS    │
│  THAT IS TO FUNCTION AS A BEAMFORMER (BEAMFORMER STATION) IN A  │
│        FIRST FREQUENCY BAND (E.G., 5 GHZ FREQUENCY BAND)        │
│                              2702                                │
└─────────────────────────────────────────────────────────────────┘
                                  │
                                  ▼
┌─────────────────────────────────────────────────────────────────┐
│  WIRELESSLY RECEIVE A NDP FRAME FROM THE BEAMFORMER STATION IN  │
│  A SECOND FREQUENCY BAND (E.G., 6 GHZ FREQUENCY BAND), WHEREIN  │
│  THE SECOND FREQUENCY BAND IS A HIGHER FREQUENCY BAND THAN THE  │
│                      FIRST FREQUENCY BAND                       │
│                              2704                                │
└─────────────────────────────────────────────────────────────────┘
                                  │
                                  ▼
┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
│  WIRELESSLY RECEIVE A BFRP TRIGGER FRAME FROM THE BEAMFORMER    │
│                STATION IN THE FIRST FREQUENCY BAND              │
│                              2706                                │
└ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘
                                  │
                                  ▼
┌─────────────────────────────────────────────────────────────────┐
│   WIRELESSLY TRANSMIT A CBF/CQI FRAME TO THE BEAMFORMER STATION │
│                    IN THE FIRST FREQUENCY BAND                  │
│                              2708                                │
└─────────────────────────────────────────────────────────────────┘
                                  │
                                  ▼
┌─────────────────────────────────────────────────────────────────┐
│  WIRELESSLY RECEIVE A BEAMFORMED DATA FRAME FROM THE BEAMFORMER │
│                STATION IN THE SECOND FREQUENCY BAND             │
│                              2710                                │
└─────────────────────────────────────────────────────────────────┘
```

FIG. 27

FRAME EXCHANGE METHOD FOR BEAMFORMING

CROSS-REFERENCE TO RELATED APPLICATION

This application is a continuation of U.S. application Ser. No. 17/448,341, filed Sep. 21, 2021, which claims the benefit of U.S. Provisional Application No. 63/084,499, filed Sep. 28, 2020, titled, "FRAME EXCHANGE METHOD FOR BEAMFORMING IN ENHANCEMENT OF IEEE 802.11AX," which are hereby incorporated by reference.

TECHNICAL FIELD

The present disclosure generally relates to wireless communications, and more specifically, relates to improving a sounding procedure in a wireless network.

BACKGROUND

Institute of Electrical and Electronics Engineers (IEEE) 802.11 is a set of physical and Media Access Control (MAC) specifications for implementing Wireless Local Area Network (WLAN) communications. These specifications provide the basis for wireless network products using the Wi-Fi brand managed and defined by the Wi-Fi Alliance. The specifications define the use of the 2.400-2.500 Gigahertz (GHz) as well as the 4.915-5.825 GHz bands. These spectrum bands are commonly referred to as the 2.4 GHz and 5 GHz bands. Each spectrum is subdivided into channels with a center frequency and bandwidth. The 2.4 GHz band is divided into 14 channels spaced 5 Megahertz (MHz) apart, though some countries regulate the availability of these channels. The 5 GHz band is more heavily regulated than the 2.4 GHz band and the spacing of channels varies across the spectrum with a minimum of a 5 MHz spacing dependent on the regulations of the respective country or territory.

WLAN devices are currently being deployed in diverse environments. These environments are characterized by the existence of many Access Points (APs) and non-AP stations (STAs) in geographically limited areas. Increased interference from neighboring devices gives rise to performance degradation. Additionally, WLAN devices are increasingly required to support a variety of applications such as video, cloud access, and offloading. Video traffic, in particular, is expected to be the dominant type of traffic in WLAN deployments. With the real-time requirements of some of these applications, WLAN users demand improved performance.

In the enhancement of IEEE 802.11ax, the use of multiple frequency bands (e.g., 2.4 GHz band, 5 GHz band, and 6 GHz band) is considered. The transmit power spectral density regulation in the 6 GHz frequency band is 12 decibels (dB) lower than in the 5 GHz frequency band. Thus, the coverage of the basic service set (BSS) operating in the 6 GHz frequency band is much smaller than that of a BSS operating in the 5 GHz frequency band. One way to address such coverage mismatch is to use beamformed transmissions.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 6 shows a table comparing various iterations of Institute of Electrical and Electronics Engineers (IEEE) 802.11 standard, in accordance with some embodiments of the present disclosure.

FIG. 7 shows a table, which describes fields of an Extreme High Throughput (EHT) frame format, in accordance with some embodiments of the present disclosure.

FIG. 12 shows a table of B0 and B1 bit values and their meanings in the modified sounding dialog token field format, according to some example embodiments.

FIG. 20 shows a method for performing a sounding procedure, in accordance with an example embodiment.

FIG. 21 shows a method for performing a sounding procedure, in accordance with an example embodiment.

FIG. 27 shows a method for performing a sounding procedure using multiple frequency bands, in accordance with an example embodiment.

DETAILED DESCRIPTION

Figure 1:
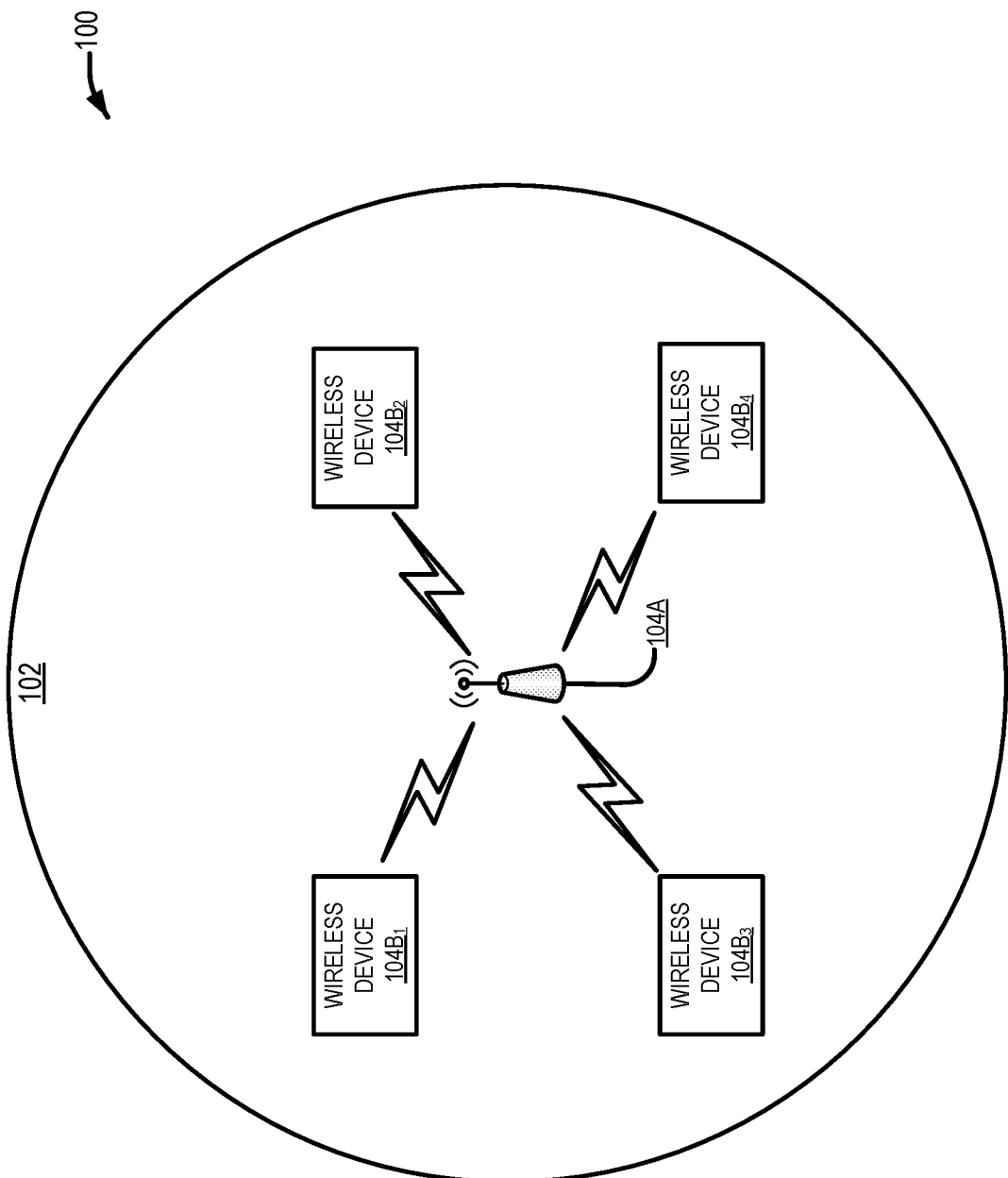
FIG. 1 illustrates an example wireless local area network (WLAN) with a basic service set (BSS) that includes a plurality of wireless devices, in accordance with some embodiments of the present disclosure.

The present disclosure generally relates to wireless communications, and more specifically, relates to improving a sounding procedure in a wireless network.

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

FIG. 1 shows a wireless local area network (WLAN) 100 with a basic service set (BSS) 102 that includes a plurality of wireless devices 104 (sometimes referred to as WLAN devices 104). Each of the wireless devices 104 may include a medium access control (MAC) layer and a physical (PHY) layer according to an IEEE (Institute of Electrical and Electronics Engineers) standard 802.11, including one or more of the amendments (e.g., 802.11a/b/g/n/p/ac/ax/bd/be). In one embodiment, the MAC layer of a wireless device 104 may initiate transmission of a frame to another wireless device 104 by passing a PHY-TXSTART.request (TXVECTOR) to the PHY layer. The TXVECTOR provides parameters for generating and/or transmitting a corresponding frame. Similarly, a PHY layer of a receiving wireless device may generate an RXVECTOR, which includes parameters of a received frame and is passed to a MAC layer for processing.

The plurality of wireless devices 104 may include a wireless device 104A that is an access point (sometimes referred to as an AP station or AP STA) and the other wireless devices $104B_1$-$104B_4$ that are non-AP stations (sometimes referred to as non-AP STAs). Alternatively, all the plurality of wireless devices 104 may be non-AP STAs in an ad-hoc networking environment. In general, the AP STA (e.g., wireless device 104A) and the non-AP STAs (e.g., wireless devices $104B_1$-$104B_4$) may be collectively referred to as STAs. However, for ease of description, only the non-AP STAs may be referred to as STAs. Although shown with four non-AP STAs (e.g., the wireless devices $104B_1$-$104B_4$), the WLAN 100 may include any number of non-AP STAs (e.g., one or more wireless devices 104B).

Figure 2:
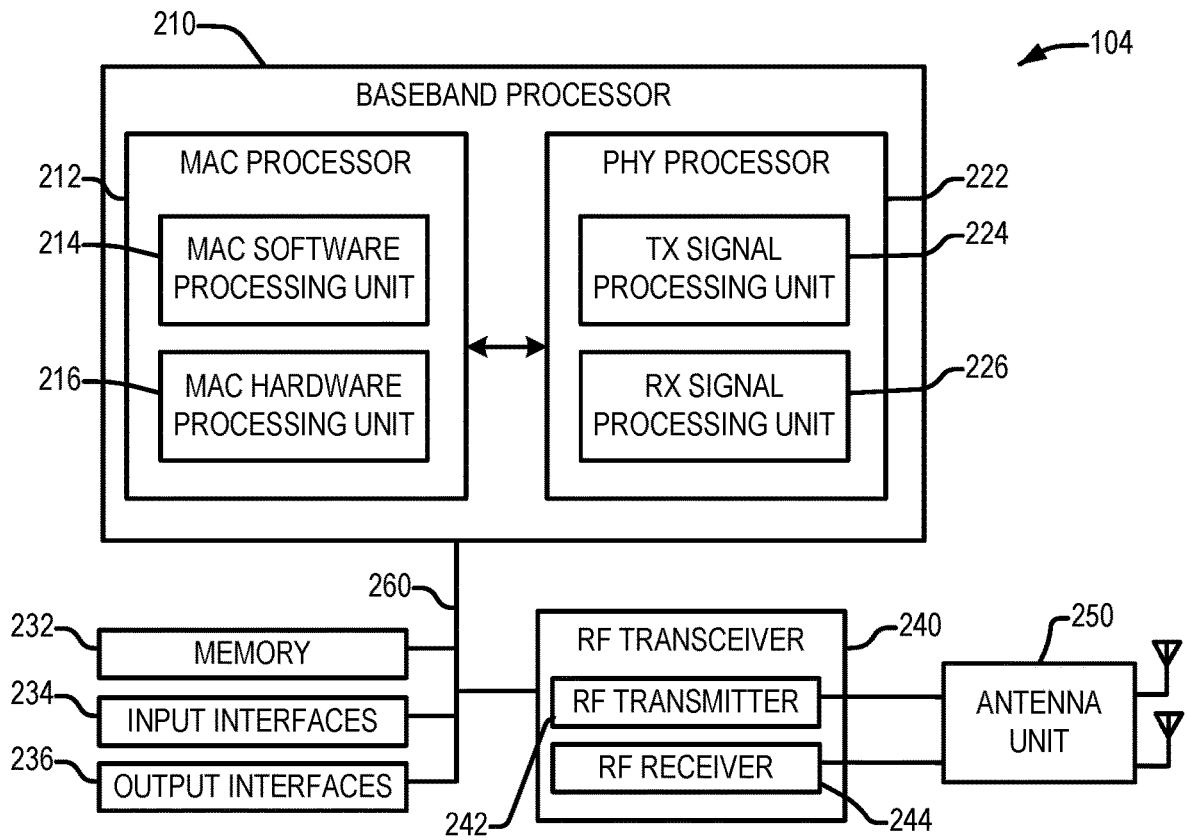
FIG. 2 is a schematic diagram of a wireless device, in accordance with some embodiments of the present disclosure.

FIG. 2 illustrates a schematic block diagram of a wireless device 104, according to an embodiment. The wireless device 104 may be the wireless device 104A (i.e., the AP of the WLAN 100) or any of the wireless devices $104B_1$-$104B_4$ in FIG. 1. The wireless device 104 includes a baseband processor 210, a radio frequency (RF) transceiver 240, an antenna unit 250, a storage device (e.g., memory) 232, one or more input interfaces 234, and one or more output interfaces 236. The baseband processor 210, the storage device 232, the input interfaces 234, the output interfaces 236, and the RF transceiver 240 may communicate with each other via a bus 260.

The baseband processor 210 performs baseband signal processing and includes a MAC processor 212 and a PHY processor 222. The baseband processor 210 may utilize the memory 232, which may include a non-transitory computer/machine readable medium having software (e.g., computer/machine programing instructions) and data stored therein.

In an embodiment, the MAC processor 212 includes a MAC software processing unit 214 and a MAC hardware processing unit 216. The MAC software processing unit 214 may implement a first plurality of functions of the MAC layer by executing MAC software, which may be included in the software stored in the storage device 232. The MAC hardware processing unit 216 may implement a second plurality of functions of the MAC layer in special-purpose hardware. However, the MAC processor 212 is not limited thereto. For example, the MAC processor 212 may be configured to perform the first and second plurality of functions entirely in software or entirely in hardware according to an implementation.

The PHY processor 222 includes a transmitting (TX) signal processing unit (SPU) 224 and a receiving (RX) SPU 226. The PHY processor 222 implements a plurality of functions of the PHY layer. These functions may be performed in software, hardware, or a combination thereof according to an implementation.

Functions performed by the transmitting SPU 224 may include one or more of Forward Error Correction (FEC) encoding, stream parsing into one or more spatial streams, diversity encoding of the spatial streams into a plurality of space-time streams, spatial mapping of the space-time streams to transmit chains, inverse Fourier Transform (iFT) computation, Cyclic Prefix (CP) insertion to create a Guard Interval (GI), and the like. Functions performed by the receiving SPU 226 may include inverses of the functions performed by the transmitting SPU 224, such as GI removal, Fourier Transform computation, and the like.

The RF transceiver 240 includes an RF transmitter 242 and an RF receiver 244. The RF transceiver 240 is configured to transmit first information received from the baseband processor 210 to the WLAN 100 (e.g., to another WLAN device 104 of the WLAN 100) and provide second information received from the WLAN 100 (e.g., from another WLAN device 104 of the WLAN 100) to the baseband processor 210.

The antenna unit 250 includes one or more antennas. When Multiple-Input Multiple-Output (MIMO) or Multi-User MIMO (MU-MIMO) is used, the antenna unit 250 may include a plurality of antennas. In an embodiment, the antennas in the antenna unit 250 may operate as a beam-formed antenna array. In an embodiment, the antennas in the antenna unit 250 may be directional antennas, which may be fixed or steerable.

The input interfaces 234 receive information from a user, and the output interfaces 236 output information to the user. The input interfaces 234 may include one or more of a keyboard, keypad, mouse, touchscreen, microphone, and the like. The output interfaces 236 may include one or more of a display device, touch screen, speaker, and the like.

As described herein, many functions of the WLAN device 104 may be implemented in either hardware or software. Which functions are implemented in software and which functions are implemented in hardware will vary according to constraints imposed on a design. The constraints may include one or more of design cost, manufacturing cost, time to market, power consumption, available semiconductor technology, etc.

As described herein, a wide variety of electronic devices, circuits, firmware, software, and combinations thereof may be used to implement the functions of the components of the WLAN device 104. Furthermore, the WLAN device 104 may include other components, such as application processors, storage interfaces, clock generator circuits, power supply circuits, and the like, which have been omitted in the interest of brevity.

Figure 3A:
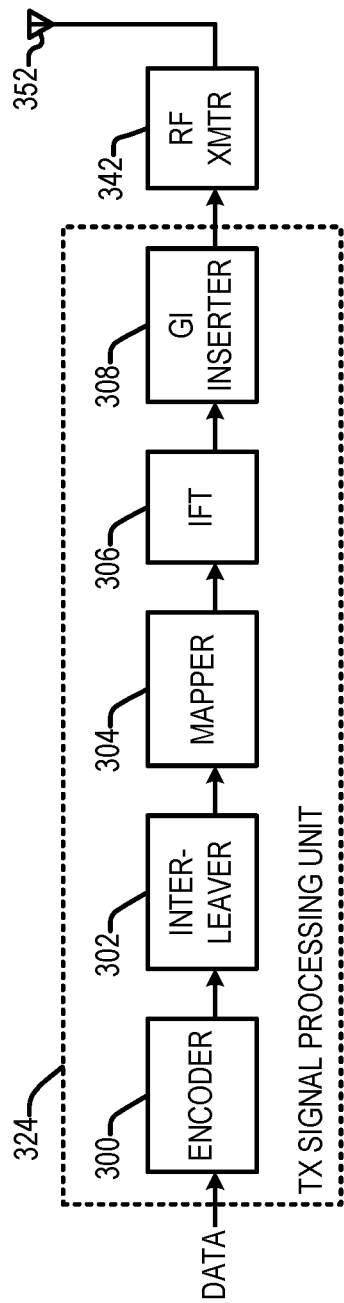
FIG. 3A illustrates components of a wireless device configured to transmit data, in accordance with some embodiments of the present disclosure.

FIG. 3A illustrates components of a WLAN device 104 configured to transmit data according to an embodiment, including a transmitting (Tx) SPU (TxSP) 324, an RF transmitter 342, and an antenna 352. In an embodiment, the TxSP 324, the RF transmitter 342, and the antenna 352 correspond to the transmitting SPU 224, the RF transmitter 242, and an antenna of the antenna unit 250 of FIG. 2, respectively.

The TxSP 324 includes an encoder 300, an interleaver 302, a mapper 304, an inverse Fourier transformer (IFT) 306, and a guard interval (GI) inserter 308.

The encoder 300 receives and encodes input data. In an embodiment, the encoder 300 includes a forward error correction (FEC) encoder. The FEC encoder may include a binary convolution code (BCC) encoder followed by a puncturing device. The FEC encoder may include a low-density parity-check (LDPC) encoder.

The TxSP 324 may further include a scrambler for scrambling the input data before the encoding is performed by the encoder 300 to reduce the probability of long sequences of 0s or 1s. When the encoder 300 performs the BCC encoding, the TxSP 324 may further include an encoder parser for demultiplexing the scrambled bits among a plurality of BCC encoders. If LDPC encoding is used in the encoder, the TxSP 324 may not use the encoder parser.

The interleaver 302 interleaves the bits of each stream output from the encoder 300 to change an order of bits therein. The interleaver 302 may apply the interleaving only when the encoder 300 performs BCC encoding and otherwise may output the stream output from the encoder 300 without changing the order of the bits therein.

The mapper 304 maps the sequence of bits output from the interleaver 302 to constellation points. If the encoder 300 performed LDPC encoding, the mapper 304 may also perform LDPC tone mapping in addition to constellation mapping.

When the TxSP 324 performs a MIMO or MU-MIMO transmission, the TxSP 324 may include a plurality of interleavers 302 and a plurality of mappers 304 according to a number of spatial streams (NSS) of the transmission. The TxSP 324 may further include a stream parser for dividing the output of the encoder 300 into blocks and may respectively send the blocks to different interleavers 302 or mappers 304. The TxSP 324 may further include a space-time block code (STBC) encoder for spreading the constellation points from the spatial streams into a number of space-time streams (NSTS) and a spatial mapper for mapping the space-time streams to transmit chains. The spatial mapper may use direct mapping, spatial expansion, or beamforming.

The IFT 306 converts a block of the constellation points output from the mapper 304 (or, when MIMO or MU-MIMO is performed, the spatial mapper) to a time domain block (i.e., a symbol) by using an inverse discrete Fourier transform (IDFT) or an inverse fast Fourier transform (IFFT). If the STBC encoder and the spatial mapper are used, the IFT 306 may be provided for each transmit chain.

When the TxSP 324 performs a MIMO or MU-MIMO transmission, the TxSP 324 may insert cyclic shift diversities (CSDs) to prevent unintentional beamforming. The TxSP 324 may perform the insertion of the CSD before or after the IFT 306. The CSD may be specified per transmit chain or may be specified per space-time stream. Alternatively, the CSD may be applied as a part of the spatial mapper.

When the TxSP 324 performs a MIMO or MU-MIMO transmission, some blocks before the spatial mapper may be provided for each user.

The GI inserter 308 prepends a GI to each symbol produced by the IFT 306. Each GI may include a Cyclic Prefix (CP) corresponding to a repeated portion of the end of the symbol that the GI precedes. The TxSP 324 may optionally perform windowing to smooth edges of each symbol after inserting the GI.

The RF transmitter 342 converts the symbols into an RF signal and transmits the RF signal via the antenna 352. When the TxSP 324 performs a MIMO or MU-MIMO transmission, the GI inserter 308 and the RF transmitter 342 may be provided for each transmit chain.

Figure 3B:
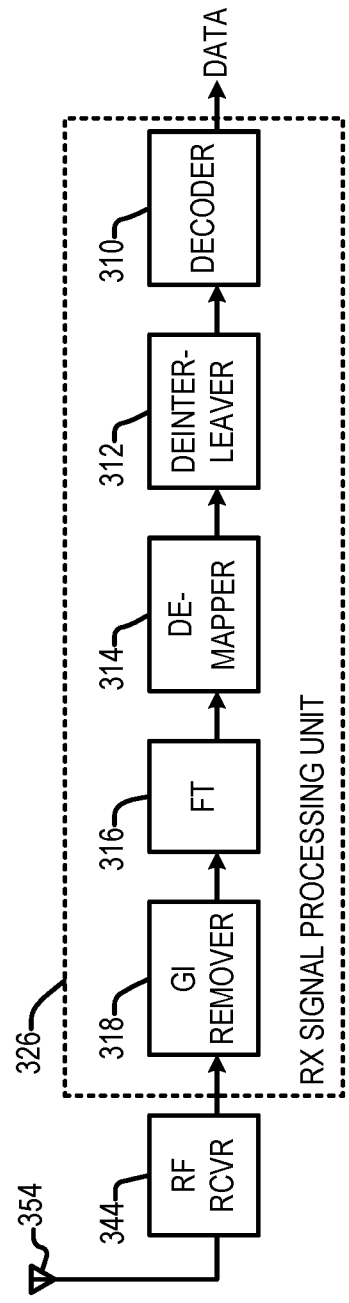
FIG. 3B illustrates components of a wireless device configured to receive data, in accordance with some embodiments of the present disclosure.

FIG. 3B illustrates components of a WLAN device 104 configured to receive data according to an embodiment, including a Receiver (Rx) SPU (RxSP) 326, an RF receiver 344, and an antenna 354. In an embodiment, the RxSP 326, RF receiver 344, and antenna 354 may correspond to the receiving SPU 226, the RF receiver 244, and an antenna of the antenna unit 250 of FIG. 2, respectively.

The RxSP 326 includes a GI remover 318, a Fourier transformer (FT) 316, a demapper 314, a deinterleaver 312, and a decoder 310.

The RF receiver 344 receives an RF signal via the antenna 354 and converts the RF signal into symbols. The GI remover 318 removes the GI from each of the symbols. When the received transmission is a MIMO or MU-MIMO transmission, the RF receiver 344 and the GI remover 318 may be provided for each receive chain.

The FT 316 converts each symbol (that is, each time domain block) into a frequency domain block of constellation points by using a discrete Fourier transform (DFT) or a fast Fourier transform (FFT). The FT 316 may be provided for each receive chain.

When the received transmission is the MIMO or MU-MIMO transmission, the RxSP 326 may include a spatial demapper for converting the respective outputs of the FTs 316 of the receiver chains to constellation points of a plurality of space-time streams, and an STBC decoder for despreading the constellation points from the space-time streams into one or more spatial streams.

The demapper 314 demaps the constellation points output from the FT 316 or the STBC decoder to bit streams. If the received transmission was encoded using LDPC encoding, the demapper 314 may further perform LDPC tone demapping before performing the constellation demapping.

The deinterleaver 312 deinterleaves the bits of each stream output from the demapper 314. The deinterleaver 312 may perform the deinterleaving only when the received transmission was encoded using BCC encoding, and otherwise may output the stream output by the demapper 314 without performing deinterleaving.

When the received transmission is the MIMO or MU-MIMO transmission, the RxSP 326 may use a plurality of demappers 314 and a plurality of deinterleavers 312 corresponding to the number of spatial streams of the transmission. In this case, the RxSP 326 may further include a stream deparser for combining the streams output from the deinterleavers 312.

The decoder 310 decodes the streams output from the deinterleaver 312 or the stream deparser. In an embodiment, the decoder 310 includes an FEC decoder. The FEC decoder may include a BCC decoder or an LDPC decoder.

The RxSP 326 may further include a descrambler for descrambling the decoded data. When the decoder 310 performs BCC decoding, the RxSP 326 may further include an encoder deparser for multiplexing the data decoded by a plurality of BCC decoders. When the decoder 310 performs the LDPC decoding, the RxSP 326 may not use the encoder deparser.

Before making a transmission, wireless devices such as wireless device 104 will assess the availability of the wireless medium using Clear Channel Assessment (CCA). If the medium is occupied, CCA may determine that it is busy, while if the medium is available, CCA determines that it is idle.

The PHY entity for IEEE 802.11 is based on Orthogonal Frequency Division Multiplexing (OFDM) or Orthogonal Frequency Division Multiple Access (OFDMA). In either OFDM or OFDMA Physical (PHY) layers, a STA (e.g., a wireless device 104) is capable of transmitting and receiving Physical Layer (PHY) Protocol Data Units (PPDUs) that are compliant with the mandatory PHY specifications. A PHY specification defines a set of Modulation and Coding Schemes (MCS) and a maximum number of spatial streams. Some PHY entities define downlink (DL) and uplink (UL) Multi-User (MU) transmissions having a maximum number of space-time streams (STS) per user and employing up to a predetermined total number of STSs. A PHY entity may provide support for 10 Megahertz (MHz), 20 MHz, 40 MHz, 80 MHz, 160 MHz, 240 MHz, and 320 MHz contiguous channel widths and support for an 80+80, 80+160 MHz, and 160+160 MHz non-contiguous channel width. Each channel includes a plurality of subcarriers, which may also be referred to as tones. A PHY entity may define signaling fields denoted as Legacy Signal (L-SIG), Signal A (SIG-A), and Signal B (SIG-B), and the like within a PPDU by which some necessary information about PHY Service Data Unit (PSDU) attributes are communicated. The descriptions below, for sake of completeness and brevity, refer to OFDM-based 802.11 technology. Unless otherwise indicated, a station refers to a non-AP STA.

Figure 4:
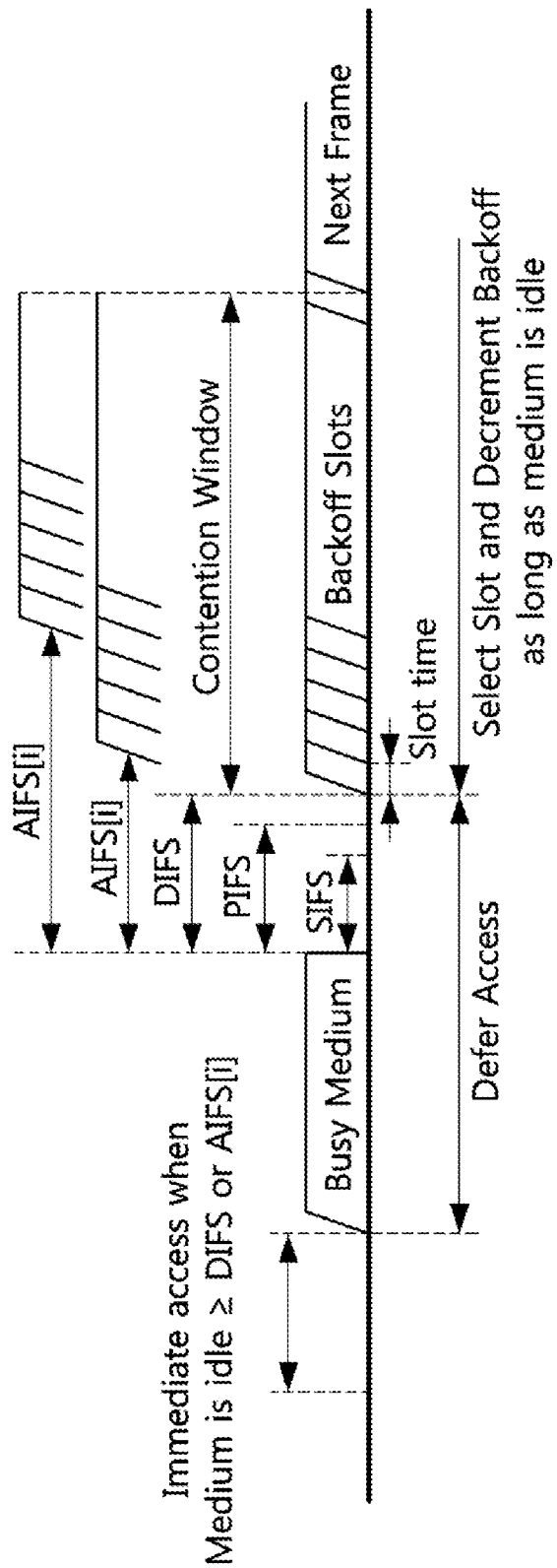
FIG. 4 illustrates Inter-Frame Space (IFS) relationships, in accordance with some embodiments of the present disclosure.

FIG. 4 illustrates Inter-Frame Space (IFS) relationships. In particular, FIG. 4 illustrates a Short IFS (SIFS), a Point Coordination Function (PCF) IFS (PIFS), a Distributed Coordination Function (DCF) IFS (DIFS), and an Arbitration IFSs corresponding to an Access Category (AC) 'i' (AIFS[i]). FIG. 4 also illustrates a slot time and a data frame is used for transmission of data forwarded to a higher layer. As shown, a WLAN device 104 transmits the data frame after performing backoff if a DIFS has elapsed during which the medium has been idle.

A management frame may be used for exchanging management information, which is not forwarded to the higher layer. Subtype frames of the management frame include a beacon frame, an association request/response frame, a probe request/response frame, and an authentication request/response frame.

A control frame may be used for controlling access to the medium. Subtype frames of the control frame include a request to send (RTS) frame, a clear to send (CTS) frame, and an acknowledgement (ACK) frame.

When the control frame is not a response frame of another frame, the WLAN device 104 transmits the control frame after performing backoff if a DIFS has elapsed during which the medium has been idle. When the control frame is the response frame of another frame, the WLAN device 104 transmits the control frame after a SIFS has elapsed without performing backoff or checking whether the medium is idle.

A WLAN device 104 that supports Quality of Service (QoS) functionality (that is, a QoS STA) may transmit the frame after performing backoff if an AIFS for an associated access category (AC) (i.e., AIFS[AC]) has elapsed. When transmitted by the QoS STA, any of the data frame, the management frame, and the control frame, which is not the response frame, may use the AIFS[AC] of the AC of the transmitted frame.

A WLAN device 104 may perform a backoff procedure when the WLAN device 104 that is ready to transfer a frame finds the medium busy. The backoff procedure includes determining a random backoff time composed of N backoff slots, where each backoff slot has a duration equal to a slot time and N being an integer number greater than or equal to zero. The backoff time may be determined according to a length of a Contention Window (CW). In an embodiment, the backoff time may be determined according to an AC of the frame. All backoff slots occur following a DIFS or Extended IFS (EIFS) period during which the medium is determined to be idle for the duration of the period.

When the WLAN device 104 detects no medium activity for the duration of a particular backoff slot, the backoff procedure shall decrement the backoff time by the slot time. When the WLAN device 104 determines that the medium is busy during a backoff slot, the backoff procedure is suspended until the medium is again determined to be idle for the duration of a DIFS or EIFS period. The WLAN device 104 may perform transmission or retransmission of the frame when the backoff timer reaches zero.

The backoff procedure operates so that when multiple WLAN devices 104 are deferring and execute the backoff procedure, each WLAN device 104 may select a backoff time using a random function and the WLAN device 104 that selects the smallest backoff time may win the contention, reducing the probability of a collision.

Figure 5:
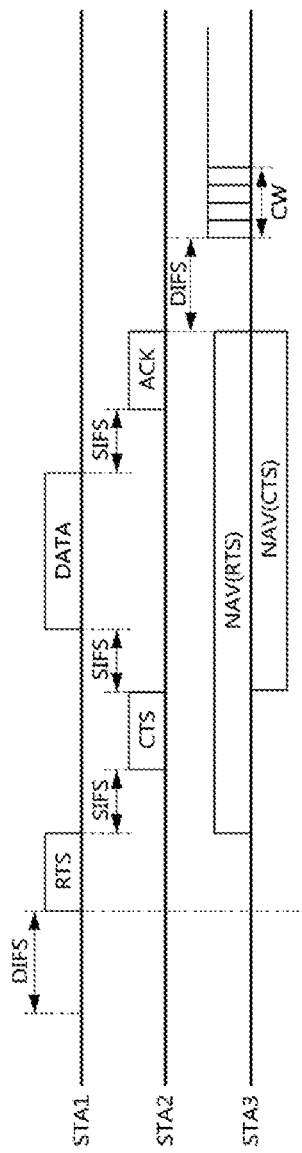
FIG. 5 illustrates a Carrier Sense Multiple Access/Collision Avoidance (CSMA/CA) based frame transmission procedure, in accordance with some embodiments of the present disclosure.

FIG. 5 illustrates a Carrier Sense Multiple Access/Collision Avoidance (CSMA/CA) based frame transmission procedure for avoiding collision between frames in a channel according to an embodiment. FIG. 5 shows a first station STA1 transmitting data, a second station STA2 receiving the data, and a third station STA3 that may be located in an area where a frame transmitted from the STA1 can be received, a frame transmitted from the second station STA2 can be received, or both can be received. The stations STA1, STA2, and STA3 may be WLAN devices 104 of FIG. 1.

The station STA1 may determine whether the channel is busy by carrier sensing. The station STA1 may determine channel occupation/status based on an energy level in the channel or an autocorrelation of signals in the channel, or may determine the channel occupation by using a network allocation vector (NAV) timer.

After determining that the channel is not used by other devices (that is, that the channel is IDLE) during a DIFS (and performing backoff if required), the station STA1 may transmit a Request-To-Send (RTS) frame to the station STA2. Upon receiving the RTS frame, after a SIFS the station STA2 may transmit a Clear-To-Send (CTS) frame as a response to the RTS frame. If Dual-CTS is enabled and the station STA2 is an AP, the AP may send two CTS frames in response to the RTS frame (e.g., a first CTS frame in a non-High Throughput format and a second CTS frame in the HT format).

When the station STA3 receives the RTS frame, it may set a NAV timer of the station STA3 for a transmission duration of subsequently transmitted frames (for example, a duration of SIFS+CTS frame duration+SIFS+data frame duration+SIFS+ACK frame duration) using duration information included in the RTS frame. When the station STA3 receives the CTS frame, it may set the NAV timer of the station STA3 for a transmission duration of subsequently transmitted frames using duration information included in the CTS frame. Upon receiving a new frame before the NAV timer expires, the station STA3 may update the NAV timer of the station STA3 by using duration information included in the new frame. The station STA3 does not attempt to access the channel until the NAV timer expires.

When the station STA1 receives the CTS frame from the station STA2, it may transmit a data frame to the station STA2 after a SIFS period elapses from a time when the CTS frame has been completely received. Upon successfully receiving the data frame, the station STA2 may transmit an ACK frame as a response to the data frame after a SIFS period elapses.

When the NAV timer expires, the third station STA3 may determine whether the channel is busy using the carrier sensing. Upon determining that the channel is not used by other devices during a DIFS period after the NAV timer has expired, the station STA3 may attempt to access the channel after a contention window elapses according to a backoff process.

When Dual-CTS is enabled, a station that has obtained a transmission opportunity (TXOP) and that has no data to transmit may transmit a CF-End frame to cut short the TXOP. An AP receiving a CF-End frame having a Basic Service Set Identifier (BSSID) of the AP as a destination address may respond by transmitting two more CF-End frames: a first CF-End frame using Space Time Block Coding (STBC) and a second CF-End frame using non-STBC. A station receiving a CF-End frame resets its NAV timer to 0 at the end of the PPDU containing the CF-End frame. FIG. 5 shows the station STA2 transmitting an ACK frame to acknowledge the successful reception of a frame by the recipient.

With clear demand for higher peak throughput/capacity in a WLAN, a new working group has been assembled to generate an amendment to IEEE 802.11. This amendment is called IEEE 802.11be (i.e., Extreme High Throughput (EHT)) and was created to support an increase to the peak PHY rate of a corresponding WLAN. Considering IEEE 802.11b through 802.11ac, the peak PHY rate has been increased by 5× to 11× as shown in FIG. 6, which presents a table 600 comparing various iterations of IEEE 802.11. In case of IEEE 802.11ax, the 802.11ax working group focused on improving efficiency, not peak PHY rate in dense environments. The maximum PHY rate (A Gbps) and PHY rate enhancement (Bx) for IEEE 802.11be could rely on the highest MCS (e.g., 4,096 QAM and its code rate).

The focus of IEEE 802.11be is primarily on WLAN indoor and outdoor operation with stationary and pedestrian speeds in the 2.4, 5, and 6 GHz frequency bands. In addition to peak PHY rate, different candidate features are under discussion. These candidate features include (1) a 320 MHz bandwidth and a more efficient utilization of a non-contiguous spectrum, (2) multi-band/multi-channel aggregation and operation, (3) 16 spatial streams and Multiple Input Multiple Output (MIMO) protocol enhancements, (4) multi-Access Point (AP) Coordination (e.g., coordinated and joint transmission), (5) an enhanced link adaptation and retransmission protocol (e.g., Hybrid Automatic Repeat Request (HARD)), and (6) adaptation to regulatory rules specific to a 6 GHz spectrum.

Some features, such as increasing the bandwidth and the number of spatial streams, are solutions that have been proven to be effective in previous projects focused on increasing link throughput and on which feasibility demonstration is achievable.

With respect to operational bands (e.g., 2.4/5/6 GHz) for IEEE 802.11be, more than 1 GHz of additional unlicensed spectrum is likely to be available because the 6 GHz band (5.925-7.125 GHz) is being considered for unlicensed use. This would allow APs and STAs to become tri-band devices. Larger than 160 MHz data transmissions (e.g., 320 MHz) could be considered to increase the maximum PHY rate. For example, 320 MHz or 160+160 MHz data could be transmitted in the 6 GHz band. For example, 160+160 MHz data could be transmitted across the 5 and 6 GHz bands.

In some embodiments, a transmitting STA generates a PPDU frame and transmits it to a receiving STA. The receiving STA receives, detects, and processes the PPDU. The PPDU can be an EHT PPDU that includes a legacy part (e.g., a legacy short training field (L-STF), a legacy long training field (L-LTF), and a legacy signal (L-SIG) field), an EHT signal A field (EHT-SIG-A), an EHT signal B field (EHT-SIG-B), an EHT hybrid automatic repeat request field (EHT-HARQ), an EHT short training field (EHT-STF), an EHT long training field (EHT-LTF), and an EHT-DATA field. FIG. 7 includes a table 700, which describes fields of an EHT frame format. In particular, table 700 describes various fields that may be within the PHY preamble, data field, and midamble of an EHT frame format. For example, table 700 includes definitions 702, durations 704, Discrete Fourier transform (DFTs) periods 706, guard intervals (GIs) 708, and subcarrier spacings 710 for one or more of a legacy short training field (L-STF) 712, legacy long training field (L-LTF) 714, legacy signal field (L-SIG) 716, repeated L-SIG (RL-SIG) 718, universal signal field (U-SIG) 720, EHT signal field (EHT-SIG) 722, EHT hybrid automatic repeat request field (EHT-HARD) 724, EHT short training field (EHT-STF) 726, EHT long training field (EHT-LTF) 728, EHT data field 730, and EHT midamble field (EHT-MA) 732.

The distributed nature of a channel access network, such as in IEEE 802.11 wireless networks, makes carrier sensing mechanisms important for collision free operation. The physical carrier sensing mechanism of one STA is responsible for detecting the transmissions of other STAs. However, it may be impossible to detect every single case in some circumstances. For example, one STA which may be a long distance away from another STA may see the medium as idle and begin transmitting a frame while the other STA is also transmitting. To overcome this hidden node, a network allocation vector (NAV) may be used. However, as wireless networks evolve to include simultaneous transmission/reception to/from multiple users within a single basic service set (BSS), such as uplink(UL)/downlink(DL) multi-user (MU) transmissions in a cascading manner, a mechanism may be needed to allow for such a situation. As used herein, a multi-user (MU) transmission refers to cases that multiple frames are transmitted to or from multiple STAs simultaneously using different resources. Examples of different resources are different frequency resources in OFDMA transmissions and different spatial streams in MU-MIMO transmissions. Therefore, DL-OFDMA, DL-MU-MIMO, UL-OFDMA, and UL-MU-MIMO are examples of MU transmissions.

Wireless network systems can rely on retransmission of media access control (MAC) protocol data units (MPDUs) when the transmitter (TX) does not receive an acknowledgement from the receiver (RX) or MPDUs are not successfully decoded by the receiver. Using an automatic repeat request (ARQ) approach, the receiver discards the last failed MPDU before receiving the newly retransmitted MPDU. With requirements of enhanced reliability and reduced latency, the wireless network system can evolve toward a hybrid ARQ (HARQ) approach.

There are two methods of HARQ processing. In a first type of HARQ scheme, also referred to as chase combining (CC) HARQ (CC-HARQ) scheme, signals to be retransmitted are the same as the signals that previously failed because all subpackets to be retransmitted use the same puncturing pattern. The puncturing is needed to remove some of the parity bits after encoding using an error-correction code. The reason why the same puncturing pattern is used with CC-HARQ is to generate a coded data sequence with forward error correction (FEC) and to make the receiver use a maximum-ratio combining (MRC) to combine the received, retransmitted bits with the same bits from the previous transmission. For example, information sequences are transmitted in packets with a fixed length. At a receiver, error correction and detection are carried out over the whole packet. However, the ARQ scheme may be inefficient in the presence of burst errors. To solve this more efficiently, subpackets are used. In subpacket transmissions, only those subpackets that include errors need to be retransmitted.

Since the receiver uses both the current and the previously received subpackets for decoding data, the error probability in decoding decreases as the number of used subpackets increases. The decoding process passes a cyclic redundancy check (CRC) and ends when the entire packet is decoded without error or the maximum number of subpackets is reached. In particular, this scheme operates on a stop-and-wait protocol such that if the receiver can decode the packet, it sends an acknowledgement (ACK) to the transmitter. When the transmitter receives an ACK successfully, it terminates the HAPQ transmission of the packet. If the receiver cannot decode the packet, it sends a negative acknowledgement (NAK) to the transmitter and the transmitter performs the retransmission process.

In a second type of HARQ scheme, also referred to as an incremental redundancy (IR) HARQ (IR-HARQ) scheme, different puncturing patterns are used for each subpacket such that the signal changes for each retransmitted subpacket in comparison to the originally transmitted subpacket. IR-HARQ alternatively uses two puncturing patterns for odd numbered and even numbered transmissions, respectively. The redundancy scheme of IR-HARQ improves the log likelihood ratio (LLR) of parity bit(s) in order to combine information sent across different transmissions due to requests and lowers the code rate as the additional subpacket is used. This results in a lower error rate of the subpacket in comparison to CC-HARQ. The puncturing pattern used in IR-HARQ is indicated by a subpacket identity (SPID) indication. The SPID of the first subpacket may always be set to 0 and all the systematic bits and the punctured parity bits are transmitted in the first subpacket. Self-decoding is possible when the receiving signal-to-noise ratio (SNR) environment is good (i.e., a high SNR). In some embodiments, subpackets with corresponding SPIDs to be transmitted are in increasing order of SPID but can be exchanged/switched except for the first SPID.

To improve WLAN systems, AP coordination has been discussed as a possible technology to be adopted in IEEE 802.11be, where there is high level classification depending on various AP coordination schemes. For example, there is a first type of technique in which data for a user is sent from a single AP (sometimes referred to as "coordinated") or there is a second type of technique in which data for a user is sent from multiple APs (sometimes referred to as "joint").

For the coordinated AP technique, multiple APs are 1) transmitting on the same frequency resource based on coordination and forming spatial nulls to allow for simultaneous transmission from multiple APs or 2) transmitting on orthogonal frequency resources by coordinating and splitting the spectrum to use the spectrum more efficiently. As for a joint AP technique, multiple APs are transmitting jointly to a given user.

The power spectral density (PSD) requirement in the 6 GHz low power indoor (LPI) frequency band is more stringent than the PSD requirement in the 2.4 GHz and 5 GHz frequency bands. As such, the 6 GHz LPI frequency band has a much shorter communication range compared to the 5 GHz frequency band. Beamforming can be used to provide similar communication range in both the 5 GHz and 6 GHz frequency bands. With beamforming, additional frames which are needed for the exchange of control information are transmitted without beamforming. Thus, the reliability of the control information exchange for beamformed transmissions in the 6 GHz frequency band should be considered.

Embodiments disclosed herein may enhance beamforming transmission performance. In one embodiment, an acknowledgement (ACK) feature for a null data packet announcement (NDPA) frame is provided that allows for determining whether the beamformees correctly received the NDPA frame. Additionally or alternatively, in one embodiment, to enlarge the transmission range/coverage of a non-beamformed NDPA frame, the NDPA frame and/or other frames used to exchange control information for beamforming are transmitted in a different (lower) frequency band from the frequency band in which beamformed data frames are transmitted.

An embodiment is a method by a wireless device functioning as a beamformer station in a wireless network to perform a sounding procedure. The method includes generating a NDPA frame, wherein the NDPA frame includes a sounding dialog token field, wherein bit B0 of the sounding dialog token field is set to binary '1' and bit B1 of the sounding dialog token field is set to binary '1' to indicate that the NDPA frame is an extremely high throughput (EHT) NDPA frame and wirelessly transmitting the NDPA frame to one or more beamformee stations. In one embodiment, the NDPA frame includes an indication of whether a beamformee station should acknowledge the NDP announcement frame or not. In one embodiment, the NDPA frame (and other frames used to exchange control information for beamforming such as the compressed beamforming/channel quality indicator (CBF/CQI) frame and beamforming report poll (BFRP) frame) is transmitted in a first frequency band, while the beamformed data frame is transmitted in a second frequency band that is a higher frequency band than the first frequency band.

To realize embodiments on top of the existing single user multiple input multiple output (SU-MIMO) and multiple user multiple input multiple output (MU-MIMO) approaches in the IEEE 802.11ax standard, several amendments to the IEEE 802.11 standard may be needed. The frame exchange sequences for SU-MIMO and MU-MIMO in IEEE 802.11ax are shown in FIGS. 8 and 9, respectively.

Figure 8:
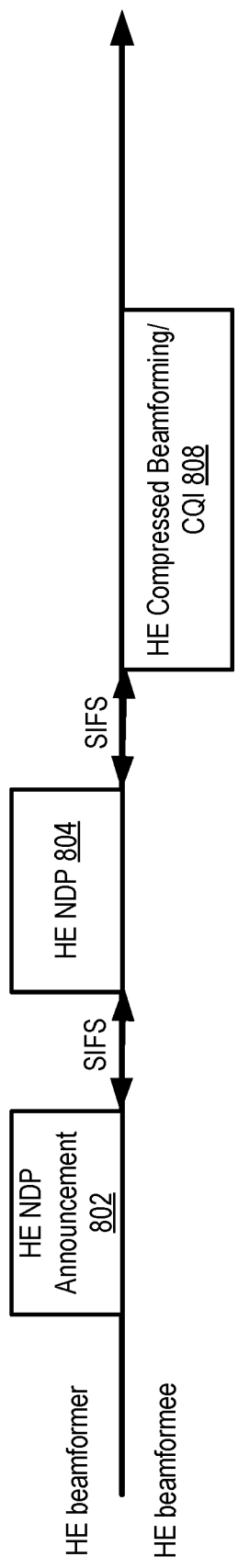
FIG. 8 shows a frame exchange sequence for single user multiple input multiple output (SU-MIMO) in 802.11ax.

FIG. 8 shows a frame exchange sequence for SU-MIMO in 802.11ax. As shown in the figure, the sequence is initiated by the high efficiency (HE) beamformer transmitting a HE NDPA frame 802. After a short interframe space (SIFS) interval, the HE beamformer transmits a HE null data packet (NDP) frame 804 to the HE beamformee to allow the HE beamformee to estimate the channel matrix and calculate the beam matrix. After another SIFS interval, the HE beamformee transmits a HE compressed beamforming/channel quality index (CBF/CQI) frame 808 that includes feedback information.

Figure 9:
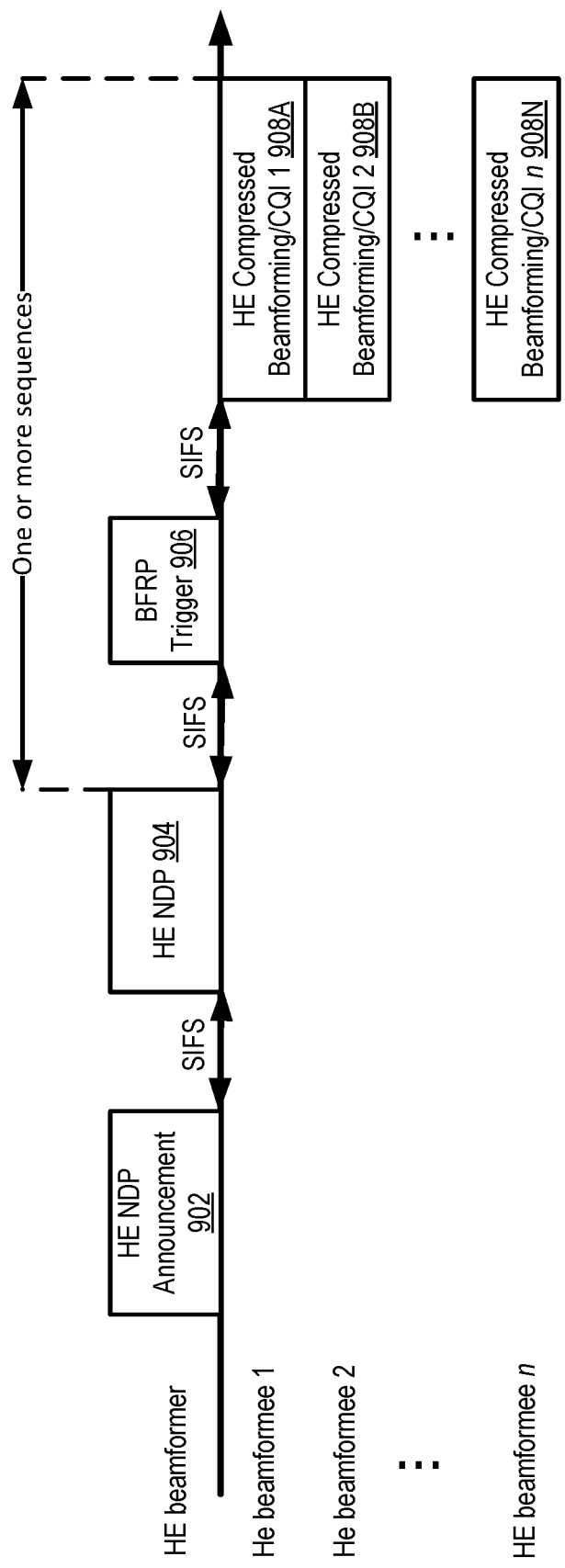
FIG. 9 shows a frame exchange sequence for multiple user multiple input multiple output (MU-MIMO) in 802.11ax.

FIG. 9 shows a frame exchange sequence for MU-MIMO in 802.11ax. As shown in the figure, the sequence is initiated by the HE beamformer transmitting a HE NDPA frame 902. After a SIFS interval, the HE beamformer transmits a HE NDP frame 904 to the HE beamformees (e.g., HE beamformees 1-n) to allow the HE beamformees to estimate the channel matrix and calculate the beam matrix. After another SIFS interval, the HE beamformer transmits a beamforming report poll (BFRP) trigger frame 906. In response, the HE beamformeess transmit HE CBF/CQI frames 908A-N. The transmission of the BFRP trigger frame 906 and HE CBF/CQI frames 908A-N may be repeated one or multiple times until all feedback information is fed back.

In the existing IEEE 802.11ax standard, an acknowledgement for the NDPA frame is not employed. Thus, when the NDPA frame is not correctly received by the beamformee(s), the beamformer cannot stop the frame exchange sequence. If an error occurs in the NDPA frame, the remaining frames in the sequence have little to no use. To avoid such unnecessary frame transmissions, embodiments provide an acknowledgement scheme for NDPA frames. To this end, embodiments may use a modified NDPA frame, which may be referred to as an extremely high throughput (EHT) NDPA frame. To better show the modification, a HE NDPA frame format is first shown in FIG. 10.

Figure 10:
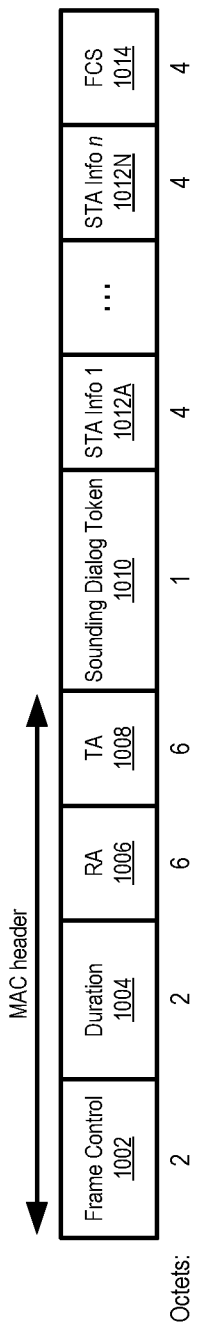
FIG. 10 shows a high efficiency (HE) null data packet announcement (NDPA) frame format in 802.11ax.

FIG. 10 shows a HE NDPA frame format in 802.11ax. As shown in the figure, the HE NDPA frame format includes a frame control field 1002 (2 octets), a duration field 1004 (2 octets), a RA field 1006 (6 octets), a TA field (6 octets), a sounding dialog token field 1010 (1 octet), station (STA) info fields 1-n 1012A-N (each field is 4 octets), and a FCS field 1014 (4 octets). The frame control field 1002, the duration field 1004, the RA field 1006, and the TA field 1008 may form the media access control (MAC) header of the frame.

An EHT NDPA frame may be a modified version of the HE NDPA frame. In one embodiment, the EHT NDPA frame includes an indication that the frame is an EHT NDPA frame. In one embodiment, the EHT NDPA frame includes an indication of an acknowledgement option.

Figure 11:
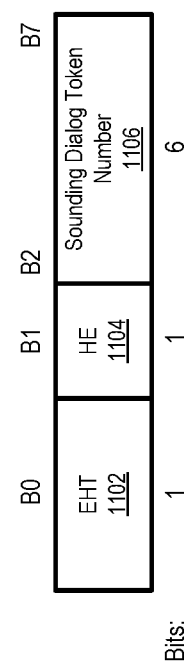
FIG. 11 shows a modified sounding dialog token field, according to some example embodiments.

For example, the sounding dialog token field may be modified as shown in FIG. 11. FIG. 11 shows a modified sounding dialog token field, according to some example embodiments. As shown in the figure, the modified sounding dialog token field includes an EHT field 1102 (1 bit), a HE field 1104 (1 bit), and a sounding dialog token number field 1106 (6 bits). The EHT field 1102 occupies bit B0 of the modified sounding dialog token field, the HE field 1104 occupies bit B1 of the modified sounding dialog token field, and the sounding dialog token number field 1106 occupies bits B2-B7 of the modified sounding dialog token field. The sounding dialog token number field 1106 is uses to indicate a value selected by the beamformer to identify the NDPA frame. Bit B0 of the sounding dialog token field was previously a reserved bit. Embodiments may use this reserved bit to indicate that the frame is an EHT NDPA frame, as shown in FIG. 12.

FIG. 12 shows a table of B0 and B1 bit values and their meanings in the modified sounding dialog token field format, according to some example embodiments. As shown in the figure, bit B0 being set to binary '0' and bit B1 being set to binary '0' indicates that the frame is a very high throughput (VHT) NDPA frame (e.g., for 802.11ac), bit B0 being set to binary '0' and bit B1 being set to binary '1' indicates that the frame is a HE NDPA frame (e.g., for 802.11ax), bit B0 being set to binary '1' and bit B1 being set to binary '0' indicates that the frame is a NDPA frame for 802.11az, and bit B0 being set to binary '1' and bit B1 being set to binary '1' indicates that the frame is an EHT NDPA frame. Thus, the combination of bit B0 and bit B1 may be used to indicate four different types of NDPA frames. While the table shows a particular mapping of bit values to particular types of NDPA frames, it should be understood that other embodiments may use a different mapping.

In one embodiment, the STA information field (also referred simply as STA info field) is modified to support an acknowledgement feature for the NDPA frame. Examples of a modified STA info field are shown in FIGS. 13 and 14.

Figure 13:
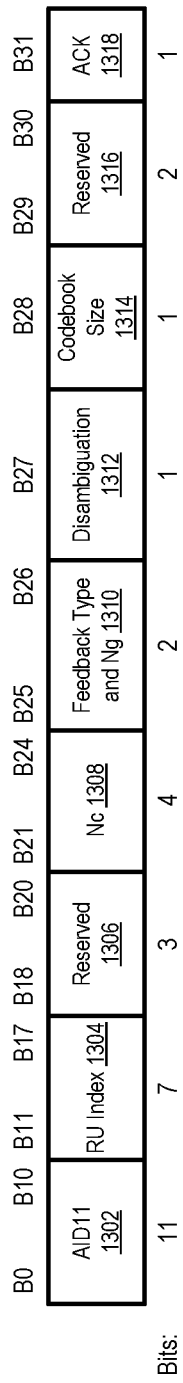
FIG. 13 shows a modified STA info field format when the association identifier (AID) value is not a special value, according to some example embodiments.

FIG. 13 shows a modified STA info field format when the association identifier (AID) value is not a special value, according to some example embodiments. As shown in the figure, the modified STA info field format includes an AID11 field 1302, a resource unit (RU) index field 1304, a reserved field 1306, a Nc field 1308, a feedback type and Ng field 1310, a disambiguation field 1312, a codebook size field 1314, another reserved field 1316, and an ACK field 1318. The position and size of the fields may be as shown in the figure. While a particular field format is shown in the figure it should be understood that other embodiments may use a variation of this field format. In one embodiment, the ACK field 1318 bit (e.g., bit B31) being set to binary '0' indicates that the beamformee receiving the corresponding NDPA frame should not acknowledge the NDPA frame (as done in existing IEEE 802.11ax beamforming frame exchange sequences) and the ACK field 1318 bit being set to binary '1' indicates that the beamformee receiving the corresponding NDPA frame should acknowledge the NDPA frame. It should be understood that a different convention may be used. While the figure shows bit B31 being used to indicate the acknowledgement option, it should be understood that other embodiments may use a different bit for this purpose (e.g., any reserved bit).

Figure 14:
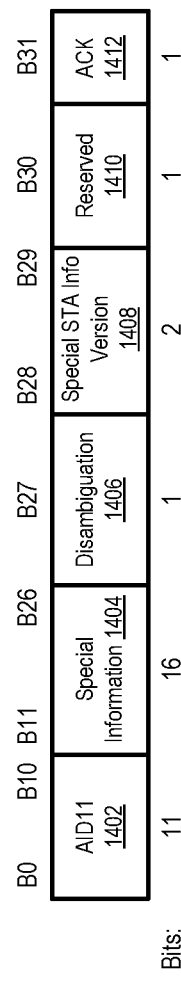
FIG. 14 shows a modified STA info field format when the AID value is a special value to convey special information, according to some example embodiments.

FIG. 14 shows a modified STA info field format when the AID value is a special value to convey special information, according to some example embodiments. As shown in the figure the modified STA info field format includes an AID11 field 1402, a special information field 1404, a disambiguation field 1406, a special STA info version field 1408, a reserved field 1410, and an ACK field 1412. The position and size of the fields may be as shown in the figure. While a particular field format is shown in the figure it should be understood that other embodiments may use a variation of this field format. In one embodiment, when the AID value is a special value (e.g., 2044), all beamformees which are recipients of the corresponding NDPA frame adopt the acknowledgment option. In one embodiment, the ACK field 1318 bit (e.g., bit B31) being set to binary '0' indicates that the beamformee receiving the corresponding NDPA frame should not acknowledge the NDPA frame (as done in existing IEEE 802.11ax beamforming frame exchange sequences) and the ACK field 1318 bit being set to binary '1' indicates that the beamformee receiving the corresponding NDPA frame should acknowledge the NDPA frame. It should be understood that a different convention may be used. While the figure shows bit B31 being used to indicate the acknowledgement option, it should be understood that other embodiments may use a different bit for this purpose (e.g., any reserved bit).

In one embodiment, instead of indicating the acknowledgment option in the NDPA frame payload, it is indicated in the SIGNAL field of the preamble of the NDPA frame. When the SIGNAL field of the preamble is used to indicate the acknowledgement option, different methods such as explicit methods and implicit methods can be considered. As an example of an explicit method, one reserved bit in the SIGNAL field of the NDPA frame can be used to indicate that acknowledgement for the NDPA frame is required. As an example of an implicit method, when the NDPA frame has a specific modulation and coding scheme (MCS) (e.g., the lowest MCS with DCM (dual subcarrier modulation) and/or a DUP (duplication) mode), this can implicitly indicate that acknowledgement for the NDPA frame is required.

In one embodiment, the NDPA frame implicitly indicates that all of the STAs indicated by the STA info fields should acknowledge the NDPA frame. As an example, if both bit B0 and bit B1 of the sounding dialog token field are set to binary '1' (indicating that the NDPA frame is an EHT NDPA frame), this may implicitly indicate that an acknowledgement for the NDPA frame is required for all of the recipient STAs. As another example, if the NDPA frame is transmitted in the 6 GHz frequency band, then this implicitly indicates that all of the STAs should acknowledge the NDPA frame.

As for another way to support this method, it can be implicitly or explicitly indicated before decoding of PSDU, where the PSDU is likely to be incorrectly decoded compared to the preamble portion of the PPDU. In this case, especially for sounding procedures, the NDPA frame may indicate to transmit an acknowledgement frame in response but the trigger frame may not indicate to transmit an acknowledgement frame in response because the receivers that correctly decode the trigger frame need to transmit trigger-based (TB) PPDU frames in response which may cause collisions with the acknowledgement frame from the receivers that incorrectly decode the trigger frame.

Figure 15:
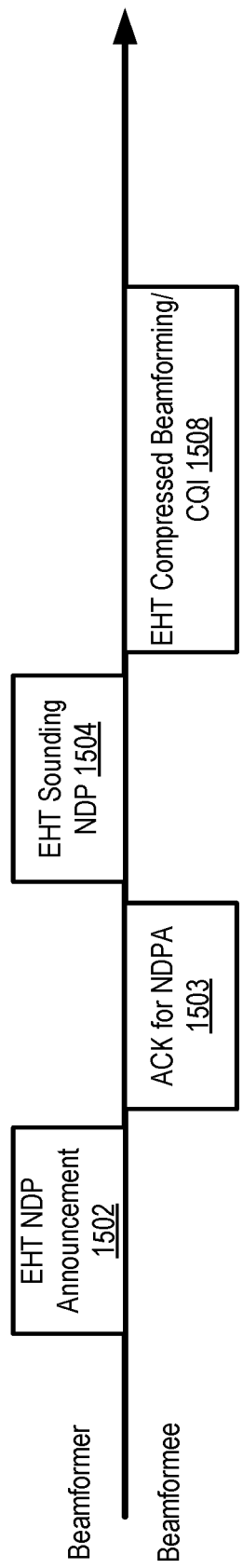
FIG. 15 shows a frame exchange sequence for SU-MIMO with acknowledgement of the NDPA frame, according to some example embodiments.
Figure 16:
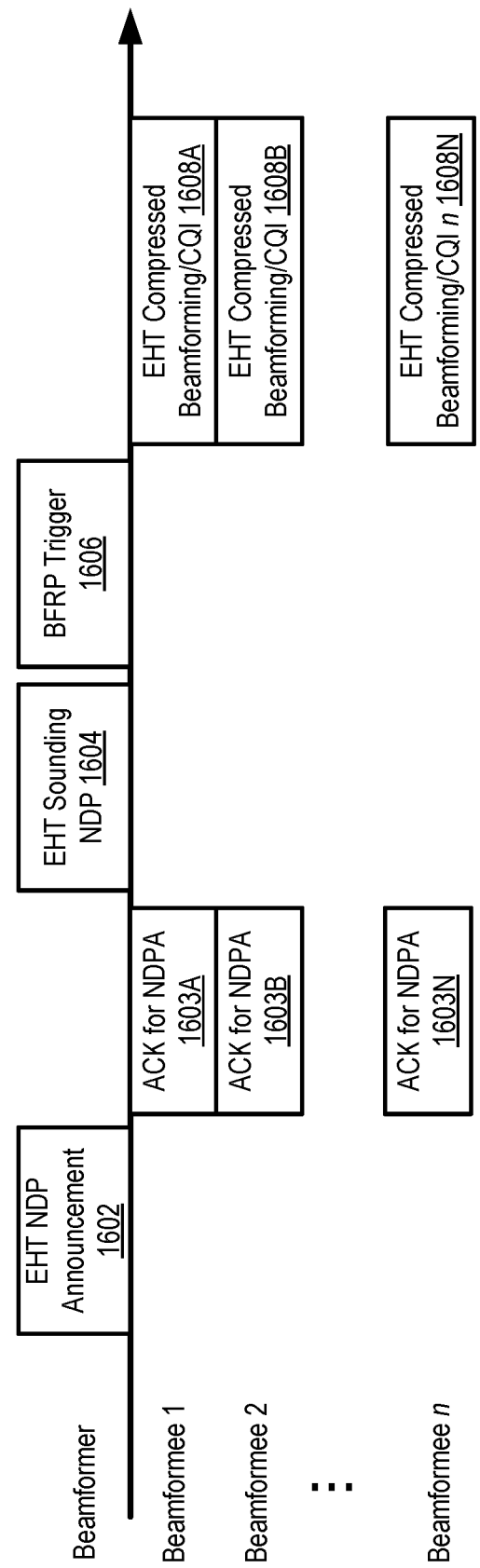
FIG. 16 shows a frame exchange sequence for MU-MIMO with acknowledgement of the NDPA frame, according to some example embodiments.

The frame exchange sequences for SU-MIMO and MU-MIMO can be modified to adopt an acknowledgement feature for the NDPA frame as shown in FIGS. 15 and 16, respectively.

FIG. 15 shows a frame exchange sequence for SU-MIMO with acknowledgement of the NDPA frame, according to some example embodiments. As shown in the figure, the sequence is initiated by the beamformer transmitting an EHT NDPA frame 1502. In response, the beamformee transmits an acknowledgement frame 1503 for the NDPA frame 1502 (assuming the beamformee correctly received the NDPA frame 1502). The beamformer then transmits an EHT sounding NDP frame 1504. The beamformee then transmits a CBF/CQI frame 1508.

FIG. 16 shows a frame exchange sequence for MU-MIMO with acknowledgement of the NDPA frame, according to some example embodiments. As shown in the figure, the sequence is initiated by the beamformer transmitting an EHT NDPA frame 1602. The beamformees that correctly receive the EHT NDPA frame 1602 transmit an acknowledgement frame 1603 for the EHT NDPA frame 1602. In this example, it is assumed that beamformees 1, 2, and n correctly received the EHT NDPA frame 1602 and thus transmit acknowledgement frames 1603A, 1603B, and 1603N, respectively. The beamformer then transmits an EHT sounding NDP frame 1604 followed by a BFRP trigger frame 1606. In response, the beamformees 1, 2, and n transmit CBF/CQI frames 1608A, 1608B, and 1608N, respectively.

In one embodiment, in the MU-MIMO case, the ACK frames transmitted by multiple beamformees are multiplexed in the frequency domain or spatial domain similar to how the CBF/CQI frames are transmitted. In another embodiment, the acknowledgement frames are transmitted at different times with a SIFS interval between them. In one embodiment, in the MU-MIMO case, the beamformer only requests CBF/CQI frames from the beamformees that acknowledged the NDPA frame. This allows for a more efficient frame exchange sequence (with less wasted transmissions).

When acknowledgement of the NDPA frame is not required, the number of STAs assigned/addressed in the NDPA frame and BFRP trigger frame may be the same because the beamformer has no information regarding which STAs correctly received the NDPA frame. However, when acknowledgement of the NDPA frame is required, the beamformer can determine that some of the STAs (particularly the ones that did not acknowledge the NDPA frame) are not likely to further participate in the sounding procedure. In this case, the beamformer may transmit a BFRP trigger frame without indicating those STAs in the STA info fields so the number of STAs assigned/addressed in the NDPA frame and the BFRP trigger frame may be different. In one embodiment, if the beamformer does not receive an acknowledgement for the NDPA frame from a beamformee, then the beamformer may retransmit the NDPA frame.

Figure 17:
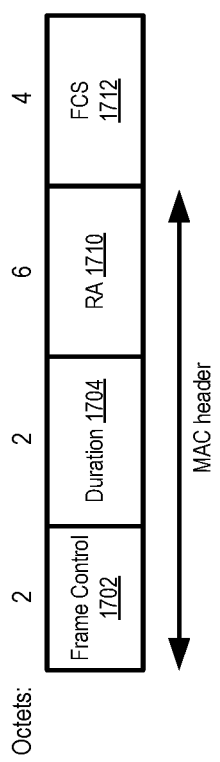
FIG. 17 shows an acknowledgement (ACK) frame format, according to some example embodiments.

For the ACK frame, the same ACK frame format that is used for acknowledging data frames or a similar format may be used. FIG. 17 shows an ACK frame format, according to some example embodiments. As shown in the figure, the ACK frame format includes a frame control field 1702 (2 octets), a duration field 1704 (2 octets), a RA field 1710 (6 octets)), and a FCS field 1712 (4 octets). The frame control field 1702, the duration field 1704, and the RA field 1710 may form the MAC header of the ACK frame.

In one embodiment, the ACK frame format for acknowledging a NDPA frame may be modified to include other feedback information. For example, the modified ACK frame format may include information regarding one or more of the following:

(1) NDP LTF type: 1×, 2×, 4×LTF, GI length (for example, 2×LTF with 0.8 µs GI and 2×LTF with 1.6 µs GI, and 4× HE-LTF with 3.2 µs GI)

(2) LTF Power boosting (for example, 3 dB LTE power boosting)

(3) CQI information: Average signal-to-noise ratio (SNR) for all RU (for example, the same CQI calculation rule in IEEE 802.11ax 6-bit CQI calculation can be used.)

In one embodiment, instead of CQI information, the following information can be provided: recommended CSI feedback information (e.g., Nc, codebook size, and Ng). Such information may be included in the ACK frame for the NDPA frame. After receiving such ACK frame(s) including additional information from beamformee(s), the beamformer may decide the LTF type in the NDP frame and the group of beamformees for MU-MIMO beamforming.

In one embodiment, in terms of LTF type in NDP frame, three options can be considered: (1) 2×LTF with 0.8 μs GI; (2) 2×LTF with 1.6 μs GI; (3) 4× HE-LTF with 3.2 μs GI. In addition to these, other LTF types may be included. If needed, more power boosting of LTF can be used to improve channel estimation accuracy at the beamformees.

In one embodiment Nc (the number of space-time streams) can be from 1 to 16. In one embodiment, for codebook size, quantization resolution (φ, ψ)={4, 2} or {6, 4} or {9, 7} can be used. In one embodiment, Ng (number of subcarrier in a group) is 4 or 16.

In case there are two feedback information (e.g. CQI information) in response to both the NDPA frame and NDP frame, the transmitter can use the feedback information that is more reliable depending on the NDPA frame format. It could be the CQI measured through the NDP frame since the sounding NDP frame can be beamformed. Then the receiver of the sounding NDP frame should not perform channel smoothing when generating the compressed beamforming feedback report. As another example, the transmitter may combine two CQI information from the measurement from both LTF in the NDPA frame and LTF in the NDP frame when the measurement conditions of the two frames meet some restrictions. One of the restriction may be that Nsts are the same. Another restriction could be that the beamformed condition are the same. In one embodiment, in order to use two CQI information from two different frames, the beamformer may set up the same LTF conditions to be measured two times in different channel conditions.

Beamforming techniques can be used to extend the communication range in the 6 GHz frequency band in which the maximum allowed transmit power spectral density is much lower than in other Wi-Fi frequency bands (e.g., the 5 GHz frequency band). With beamforming, communication range of a data frame can be extended compared to a non-beamformed frame. However, the NDPA frame, BFRP trigger frame, and/or CBF/CQI frames which are transmitted as part of the frame exchange sequence for beamforming are transmitted without beamforming (they are transmitted omni-directionally). Thus, the communication range extension cannot be properly achieved by beamforming because the control/management information in the non-beamformed frames such as the NDPA frame and/or BFRP trigger frames cannot be delivered.

In one embodiment, to address the above-mentioned problem, the NDPA frame, BFRP trigger frame and/or CBF/CQI frames are transmitted in a different frequency band (e.g., 5 GHz frequency band) than the beamformed transmissions (e.g., which are transmitted in 6 GHz frequency band).

Figure 18:
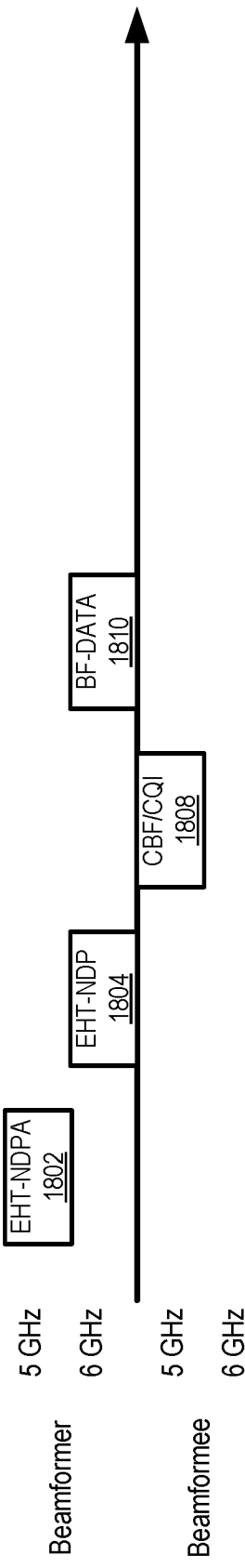
FIG. 18 shows a frame exchange sequence for SU-MIMO using two different frequency bands, according to some example embodiments.

FIG. 18 shows a frame exchange sequence for SU-MIMO using two different frequency bands, according to some example embodiments. As shown in the figure, the sequence is initiated by the beamformer transmitting an EHT NDPA frame 1802 in the 5 GHz frequency band (having high transmit power spectral density). The beamformer then transmits an EHT NDP frame 1804 in the 6 GHz frequency band (having low transmit power spectral density). The beamformee then transmits a CBF/CQI frame 1808 in the 5 GHz frequency band. The beamformer then transmits a beamformed data frame 1810 in the 6 GHz frequency band.

Figure 19:
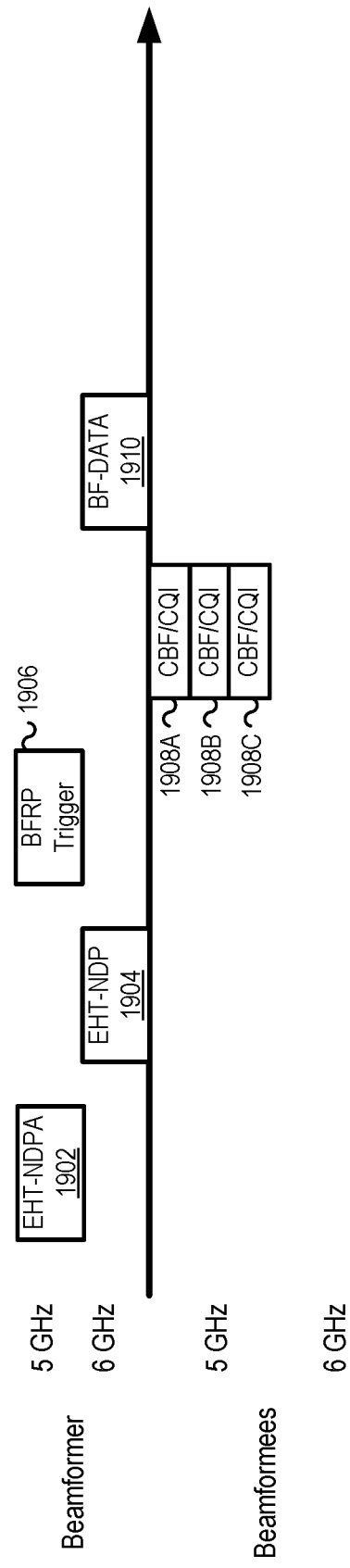
FIG. 19 shows a frame exchange sequence for MU-MIMO using two different frequency bands, according to some example embodiments.

FIG. 19 shows a frame exchange sequence for MU-MIMO using two different frequency bands, according to some example embodiments. As shown in the figure, the sequence is initiated by the beamformer transmitting an EHT NDPA frame 1902 in the 5 GHz frequency band (having high transmit power spectral density). The beamformer then transmits an EHT NDP frame 1904 in the 6 GHz frequency band (having low transmit power spectral density). The beamformer then transmits a BFRP trigger frame 1906 in the 5 GHz frequency band. In response, the beamformees transmit CBF/CQI frames 1908A, 1908B, and 1908C in the 5 GHz frequency band. The beamformer then transmits a beamformed data frame 1910 in the 6 GHz frequency band.

As shown in FIGS. 18 and 19, the NDPA frame, BPRP trigger frame, and CBF/CQI feedback frames are transmitted in the 5 GHz frequency band while the NDP frame and beamformed data frame are transmitted in the 6 GHz frequency band.

In one embodiment, if the PPDU format to supported extended range is defined, the BFRP trigger frame and/or CBF/CQI frames may be transmitted in the 6 GHz frequency band using the extended range PPDU format. In general, the extended range PPDU format has a much lower data rate so a longer time is required to transmit the same amount of data. In terms of throughput (beamforming efficiency), it may be desirable to transmit the BFRP trigger frame and/or CBF/CQI frames in the 5 GHz frequency band rather than in the 6 GHz frequency band (with the extended range PPDU format). As an example of an extended range PPDU, BPSK-DCM can be duplicated on the data portion over the given PPDU bandwidth.

When the NDPA frame and other control frames are transmitted in the same frequency band as the beamformed data frame, the resource unit (RU) information which is used for beamforming in the BSS bandwidth is enough. However, if the EHT NDPA frame is transmitted in a different frequency band from that of the beamformed data frames, additional information to indicate the frequency band for beamformed data frames may be included in the EHT NDPA frame. This may allow the beamformees to identify the frequency band and RU allocation for beamforming from the received EHT NDPA frame which is transmitted in a different frequency band. To this end, the STA info field with a special AID value (e.g., 2044) may be used to indicate the frequency band for the beamformed data frames. In one embodiment, the special information can be a center frequency of the frequency band for the beamformed data frame. Of course, other ways to indicate the frequency band used for transmitting the beamformed data frame can be used.

In one embodiment, NDPA frame acknowledgement scheme describe herein above can be added to the frame exchange sequences shown in FIGS. 18 and 19. That is, the NDPA frame acknowledgement scheme and the use of multiple frequency bands for frame exchange can be combined. The use of the techniques described herein helps improve the throughput, communication range, and reliability of sounding procedures.

Turning now to FIG. 20, a method 2000 will be described for performing a sounding procedure, in accordance with an example embodiment. The method 2000 may be performed by one or more devices described herein. For example, the method 2000 may be performed by a wireless device 104 functioning as a beamformer in a wireless network (a beamformer station).

Additionally, although shown in a particular order, in some embodiments the operations of the method 2000 (and the other methods shown in the other figures) may be performed in a different order. For example, although the operations of the method 2000 are shown in a sequential order, some of the operations may be performed in partially or entirely overlapping time periods.

As shown in FIG. 20, the method 2000 may commence at operation 2002 with a beamformer station generating a NDP announcement (NDPA) frame, wherein the NDP announcement frame includes a sounding dialog token field, wherein bit B0 of the sounding dialog token field is set to binary '1' and bit B1 of the sounding dialog token field is set to binary '1' to indicate that the NDP announcement frame is an EHT NDP announcement frame.

At operation 2004, the beamformer station wirelessly transmits the NDP announcement frame to one or more stations that are to function as beamformees in the wireless network (e.g., to initiate a sounding procedure).

Turning now to FIG. 21, a method 2100 will be described for performing a sounding procedure, in accordance with an example embodiment. The method 2100 may be performed by one or more devices described herein. For example, the method 2100 may be performed by a wireless device 104 functioning as a beamformee in a wireless network (a beamformee station).

As shown in FIG. 21, the method 2100 may commence at operation 2102 with a beamformee station wirelessly receiving a NDP announcement frame from a station that is to function as a beamformer in the wireless network (a beamformer station).

At operation 2104, the beamformee station processes the NDP announcement frame as an EHT NDP announcement frame (e.g., as opposed to a VHT or HE NDP announcement frame) in response to a determination that both bit B0 and bit B1 of a sounding dialog token field of the NDP announcement frame are set to binary '1'.

Figure 22:
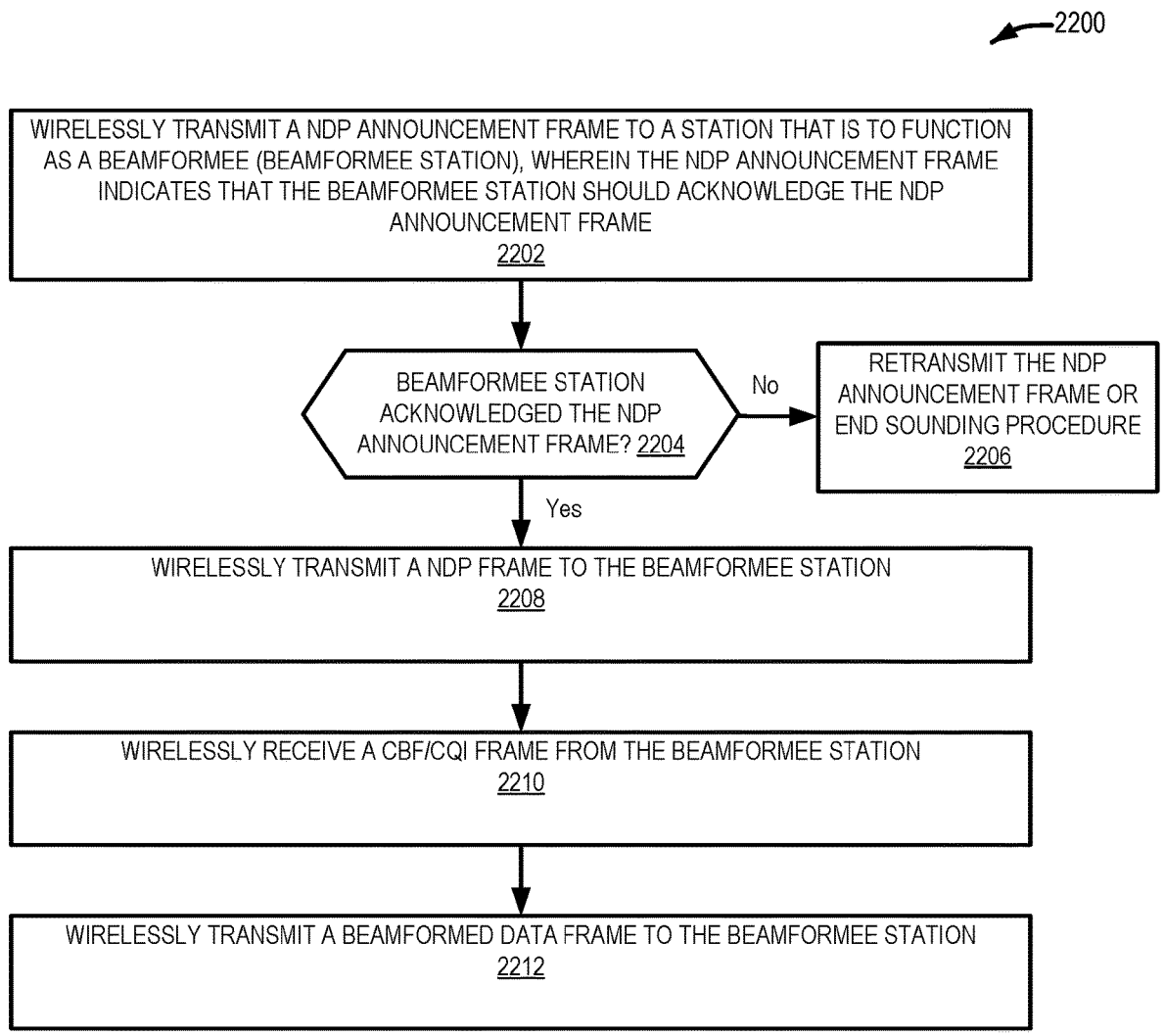
FIG. 22 shows a method for performing a sounding procedure with acknowledgement of the NDP announcement frame for a SU-MIMO case, in accordance with an example embodiment.

Turning now to FIG. 22, a method 2200 will be described for performing a sounding procedure with acknowledgement of the NDP announcement frame for a SU-MIMO case, in accordance with an example embodiment. The method 2200 may be performed by one or more devices described herein. For example, the method 2200 may be performed by a wireless device 104 functioning as a beamformer in a wireless network (a beamformer station).

As shown in FIG. 22, the method 2200 may commence at operation 2202 with a beamformer station wirelessly transmitting a NDP announcement frame to a station that is to function as a beamformee (a beamformee station), wherein the NDP announcement frame indicates that the beamformee station should acknowledge the NDP announcement frame.

At operation 2204, the beamformer station determines whether the beamformee station acknowledged the NDP announcement frame. If not, at operation 2206, the beamformer station retransmits the NDP announcement frame or ends the sounding procedure. Otherwise, if the beamformer station determines that the beamformee station acknowledged the NDP announcement frame, then at operation 2208, the beamformer station wirelessly transmits a NDP frame to the beamformee station.

At operation 2210, the beamformer station wirelessly receives a CBF/CQI frame from the beamformee station.

At operation 2212, the beamformer station wirelessly transmits a beamformed data frame to the beamformee station.

Figure 23:
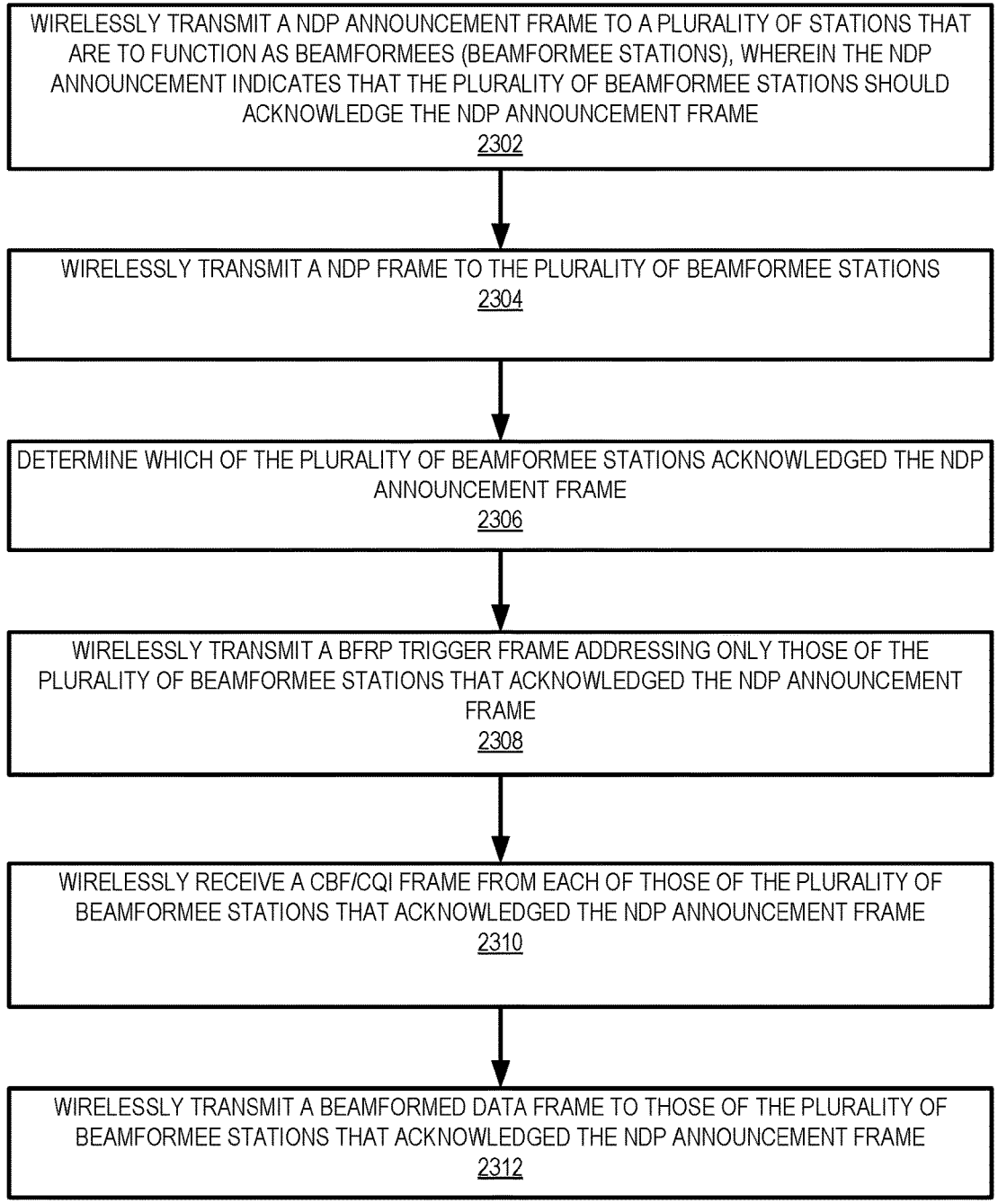
FIG. 23 shows a method for performing a sounding procedure with acknowledgement of the NDP announcement frame for a MU-MIMO case, in accordance with an example embodiment.

Turning now to FIG. 23, a method 2300 will be described for performing a sounding procedure with acknowledgement of the NDP announcement frame for a MU-MIMO case, in accordance with an example embodiment. The method 2300 may be performed by one or more devices described herein. For example, the method 2300 may be performed by a wireless device 104 functioning as a beamformer in a wireless network (a beamformer station).

As shown in FIG. 23, the method 2300 may commence at operation 2302 with a beamformer station wirelessly transmitting a NDP announcement frame to a plurality of stations that are to function as beamformees (beamformee stations), wherein the NDP announcement frame indicates that the plurality of beamformee station should acknowledge the NDP announcement frame.

At operation 2304, the beamformer station wirelessly transmits a NDP frame to the plurality of beamformee stations.

At operation 2306, the beamformer station determines which of the plurality of beamformee stations acknowledged the NDP announcement frame.

At operation 2308, the beamformer station wirelessly transmits a BFRP trigger frame addressing only those of the plurality of beamformee stations that acknowledged the NDP announcement frame.

At operation 2310, the beamformer station wirelessly receives a CBF/CQI frame from each of those of the plurality of beamformee stations that acknowledged the NDP announcement frame.

At operation 2312, the beamformer station wirelessly transmits a beamformed data frame to those of the plurality of beamformee stations that acknowledged the NDP announcement frame.

Figure 24:
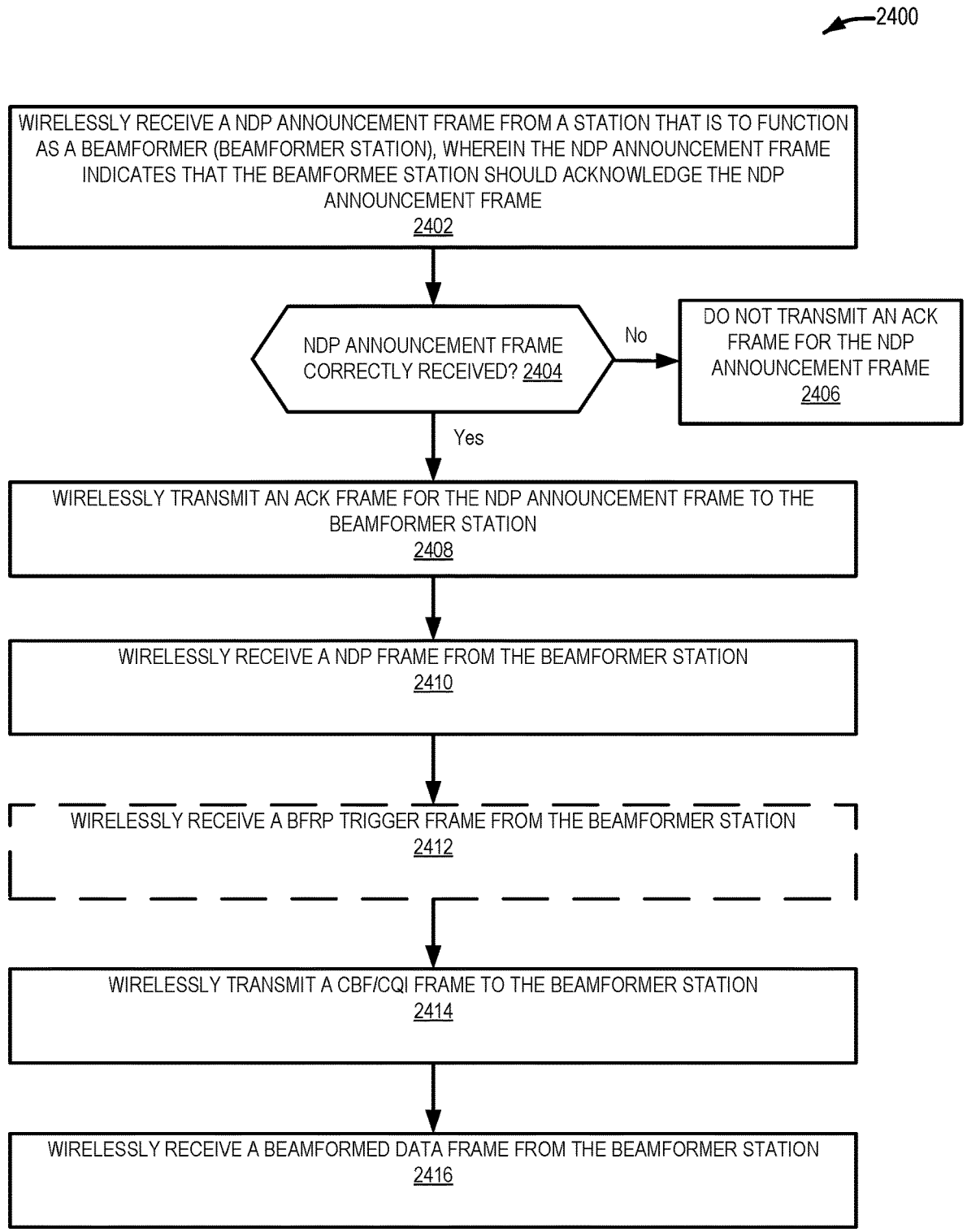
FIG. 24 shows a method for performing a sounding procedure with acknowledgement of the NDP announcement frame, in accordance with an example embodiment.

Turning now to FIG. 24, a method 2400 will be described for performing a sounding procedure with acknowledgement of the NDP announcement frame, in accordance with an example embodiment. The method 2100 may be performed by one or more devices described herein. For example, the method 2100 may be performed by a wireless device 104 functioning as a beamformee in a wireless network (a beamformee station).

As shown in FIG. 24, the method 2400 may commence at operation 2402 with a beamformee station wirelessly receiving a NDP announcement frame from a station that is to function as a beamformer in the wireless network (a beamformer station), wherein the NDP announcement frame indicates that the beamformee station should acknowledge the NDP announcement frame.

At operation 2402, the beamformee station determines whether it correctly received the NDP announcement frame. If not, at operation 2406, the beamformee station does not transmit an acknowledgement frame for the NDP announcement frame. However, if the beamformee station determines that it correctly received the NDP announcement frame, then at operation 2408, the beamformee station wirelessly transmits an acknowledgement frame for the NDP announcement frame to the beamformer station.

At operation 2410, the beamformee station wirelessly receives a NDP frame from the beamformer station.

In one embodiment (e.g., an embodiment that uses MU-MIMO), at operation 2412, the beamformee station wirelessly receives a BFRP trigger frame from the beamformer station.

At operation 2414, the beamformee station wirelessly transmits a CBF/CQI frame to the beamformer station.

At operation 2416, the beamformee station wirelessly receives a beamformed data frame from the beamformer station.

Figure 25:
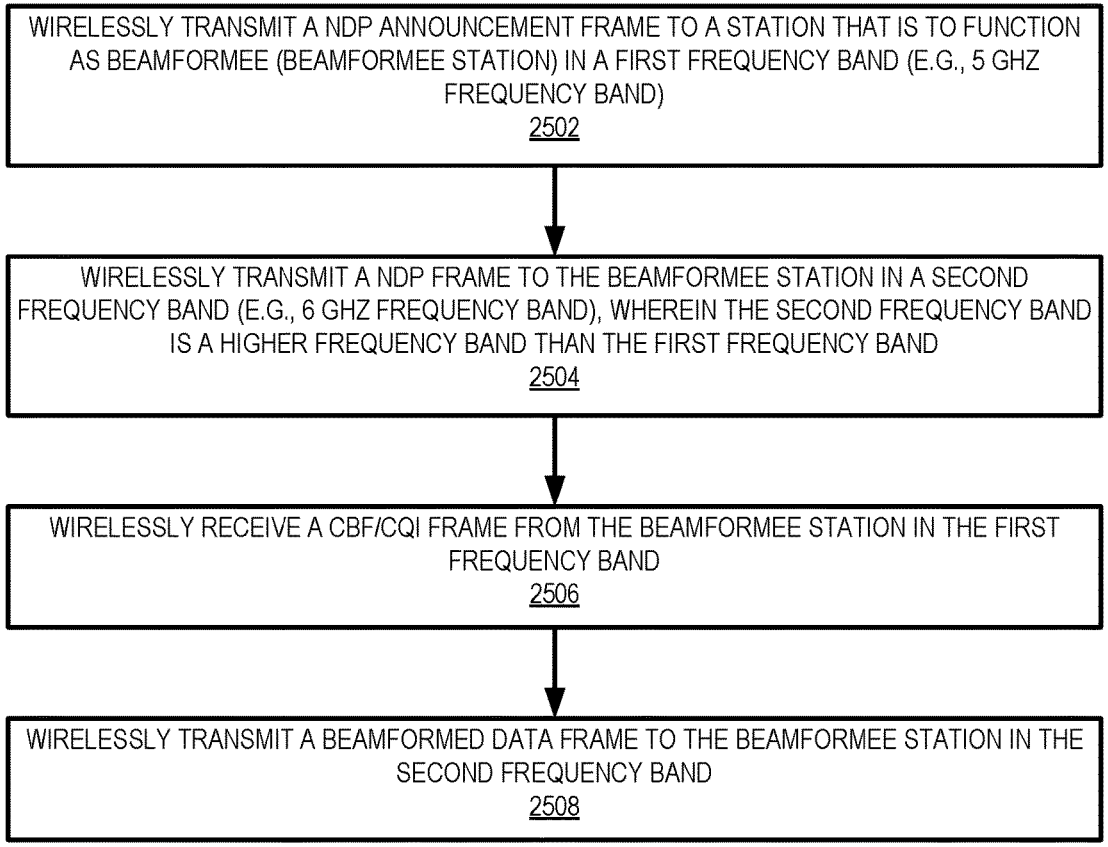
FIG. 25 shows a method for performing a sounding procedure using multiple frequency bands for a SU-MIMO case, in accordance with an example embodiment.

Turning now to FIG. 25, a method 2500 will be described for performing a sounding procedure using multiple frequency bands for a SU-MIMO case, in accordance with an example embodiment. The method 2500 may be performed by one or more devices described herein. For example, the method 2500 may be performed by a wireless device 104 functioning as a beamformer in a wireless network (a beamformer station).

As shown in FIG. 25, the method 2500 may commence at operation 2502 with a beamformer station wirelessly transmitting a NDP announcement frame to a station that is to function as a beamformee (a beamformee station) in a first frequency band (e.g., 5 GHz frequency band).

At operation 2504, the beamformer station wirelessly transmits a NDP frame to the beamformee station in a second frequency band (e.g., 6 GHz frequency band), wherein the second frequency band is a higher frequency band than the first frequency band.

At operation 2506, the beamformer station wirelessly receives a CBF/CQI frame from the beamformee station in the first frequency band.

At operation 2508, the beamformer station wirelessly transmits a beamformed data frame to the beamformee station in the second frequency band.

Figure 26:
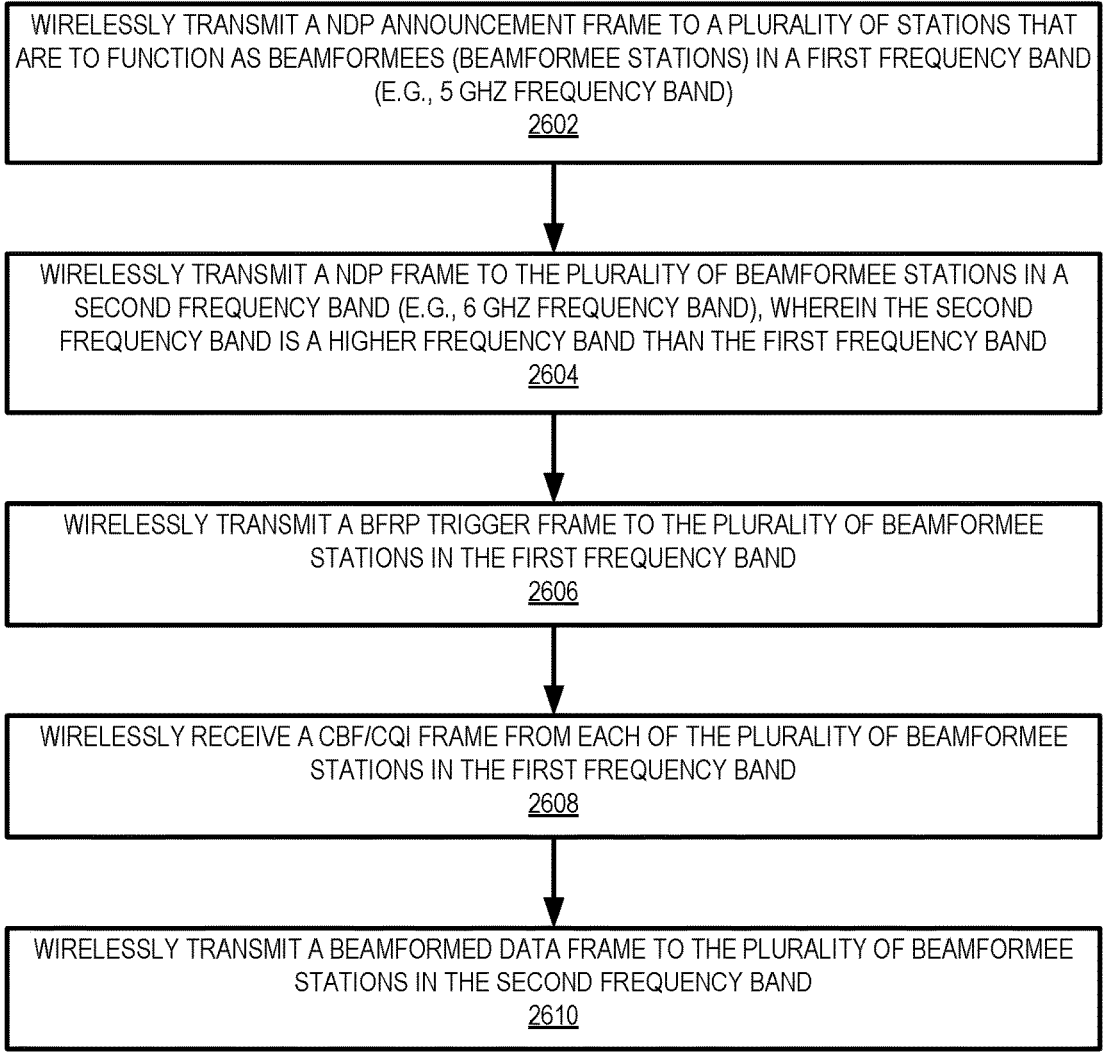
FIG. 26 shows a method for performing a sounding procedure using multiple frequency bands for a MU-MIMO case, in accordance with an example embodiment.

Turning now to FIG. 26, a method 2600 will be described for performing a sounding procedure using multiple frequency bands for a MU-MIMO case, in accordance with an example embodiment. The method 2600 may be performed by one or more devices described herein. For example, the method 2600 may be performed by a wireless device 104 functioning as a beamformer in a wireless network (a beamformer station).

As shown in FIG. 26, the method 2600 may commence at operation 2602 with a beamformer station wirelessly transmitting a NDP announcement frame to a plurality of stations that are to function as beamformees (beamformee stations) in a first frequency band (e.g., 5 GHz frequency band).

At operation 2604, the beamformer station wirelessly transmits a NDP frame to the plurality of beamformee stations in a second frequency band (e.g., 6 GHz frequency band), wherein the second frequency band is a higher frequency band than the first frequency band.

At operation 2606, the beamformer station wirelessly transmits a BFRP trigger frame to the plurality of beamformee stations in the first frequency band.

At operation 2608, the beamformer station wirelessly receives a CBF/CQI frame from each of the plurality of beamformee stations in the first frequency band.

At operation 2610, the beamformer station wirelessly transmits a beamformed data frame to the plurality of beamformee stations in the second frequency band.

Turning now to FIG. 27, a method 2700 will be described for performing a sounding procedure using multiple frequency bands, in accordance with an example embodiment. The method 2700 may be performed by one or more devices described herein. For example, the method 2700 may be performed by a wireless device 104 functioning as a beamformee in a wireless network (a beamformee station).

As shown in FIG. 27, the method 2700 may commence at operation 2702 with a beamformee station wirelessly receiving a NDP announcement frame from a station that is to function as a beamformer in the wireless network (a beamformer station) in a first frequency band (e.g., 5 GHz frequency band).

At operation 2704, the beamformee station wirelessly receives a NDP frame from the beamformer station in a second frequency band (e.g., 6 GHz frequency band), wherein the second frequency band is a higher frequency band than the first frequency band.

In one embodiment (e.g., an embodiment that uses MU-MIMO), at operation 2706, the beamformee station wirelessly receives a BFRP trigger frame from the beamformer station in the first frequency band.

At operation 2708, the beamformee station wirelessly transmits a CBF/CQI frame to the beamformer station in the first frequency band.

At operation 2710, the beamformee station wirelessly receives a beamformed data frame from the beamformer station in the second frequency band.

Although many of the solutions and techniques provided herein have been described with reference to a WLAN system, it should be understood that these solutions and techniques are also applicable to other network environments, such as cellular telecommunication networks, wired networks, etc. In some embodiments, the solutions and techniques provided herein may be or may be embodied in an article of manufacture in which a non-transitory machine-readable medium (such as microelectronic memory) has stored thereon instructions which program one or more data processing components (generically referred to here as a "processor" or "processing unit") to perform the operations described herein. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

In some cases, an embodiment may be an apparatus (e.g., an AP STA, a non-AP STA, or another network or computing device) that includes one or more hardware and software logic structures for performing one or more of the operations described herein. For example, as described herein, an apparatus may include a memory unit, which stores instructions that may be executed by a hardware processor installed in the apparatus. The apparatus may also include one or more other hardware or software elements, including a network interface, a display device, etc.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system may carry out the computer-implemented methods described herein in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method performed by a wireless device functioning as a beamformee station in a wireless network to perform a sounding procedure, the method comprising:
    wirelessly receiving a null data packet (NDP) announcement frame from a beamformer station in a first frequency band, wherein the NDP announcement frame includes a sounding dialog token field where bits B0 and B1 of the sounding token field are set to binary '1' to indicate the NDP announcement frame should be processed as an extremely high throughput (EHT) NDP announcement frame; and
    wirelessly receiving an NDP frame from the beamformer station in a second frequency band in response to receiving the NDP announcement frame from the beamformer station.

2. The method of claim 1, wherein the combination of bit B0 and bit B1 indicates four types of NDP announcement frames.

3. The method of claim 2, wherein the NDP announcement frame further includes a station (STA) information field, wherein the STA information field includes an acknowledgement field that includes the indication of whether the beamformee station should acknowledge the NDP announcement frame.

4. The method of claim 3, wherein the acknowledgement field includes a single bit, wherein the single bit being set to binary '1' indicates that the beamformee station should acknowledge the NDP announcement frame and the single bit being set to binary '0' indicates that the beamformee station should not acknowledge the NDP announcement frame.

5. The method of claim 4, wherein the single bit is bit B31 of the STA information field.

6. The method of claim 1, wherein the acknowledgement frame is multiplexed in a frequency domain or spatial domain with one or more other acknowledgement frames transmitted to the beamformer station by one or more other beamformee stations.

7. The method of claim 1, further comprising:
    wirelessly receiving a NDP frame from the beamformer station after wirelessly transmitting the acknowledgement frame for the NDP announcement frame to the beamformer station;
    wirelessly transmitting a compressed beamforming channel quality indicator (CBF/CQI) frame to the beamformer station after wirelessly receiving the NDP frame from the beamformer station; and
    wirelessly receiving a beamformed data frame from the beamformer station after wirelessly transmitting the CBF/CQI frame to the beamformer station.

8. The method of claim 7, further comprising:
    wirelessly receiving a beamforming report (BFRP) trigger frame from the beamformer station after wirelessly receiving the NDP frame from the beamformer station but before wirelessly transmitting the CBF/CQI frame to the beamformer station,
    wherein the BFRP trigger frame is addressed to the beamformee station and one or more other beamformee stations that acknowledged the NDP announcement frame, wherein the CBF/CQI frame is wirelessly transmitted to the beamformer station simultaneously with one or more CBF/CQI frames transmitted by the one or more other beamformee stations in response to the BFRP trigger frame.

9. The method of claim 1, wherein the acknowledgement frame includes information regarding one or more of: a NDP long training field (LTF) type, LTF power boosting, and channel quality indicator (CQI).

10. A method performed by a wireless device functioning as a beamformee station in a wireless network to perform a sounding procedure, the method comprising:
    wirelessly receiving a null data packet (NDP) announcement frame from a beamformer station in a first frequency band; and
    wirelessly receiving a NDP frame from the beamformer station in a second frequency band after wirelessly receiving the NDP announcement frame from the beamformer station, wherein the second frequency band is different from the first frequency band.

11. The method of claim 10, wherein the NDP announcement frame includes a sounding dialog token field, wherein bit B0 of the sounding dialog token field is set to binary '1' and bit B1 of the sounding dialog token field is set to binary '1' to indicate that the NDP announcement frame is an extremely high throughput (EHT) NDP announcement frame.

12. The method of claim 10, wherein the first frequency band is a 5 Gigahertz frequency band and the second frequency band is a 6 Gigahertz frequency band.

13. The method of claim 10, further comprising:
wirelessly transmitting a compressed beamforming channel quality indicator (CBF/CQI) frame to the beamformer station in the first frequency band after wirelessly receiving the NDP frame from the beamformer station; and
wirelessly receiving a beamformed data frame from the beamformer station in the second frequency band after wirelessly transmitting the CBF/CQI frame to the beamformer station.

14. The method of claim 13, wherein the NDP announcement frame includes an indication that the beamformed data frame is to be transmitted in the second frequency band.

15. The method of claim 13, further comprising:
wirelessly receiving a beamforming report (BFRP) trigger frame from the beamformer station in the first frequency band after wirelessly receiving the NDP frame from the beamformer station but before wirelessly transmitting the CBF/CQI frame to the beamformer station,
wherein the BFRP trigger frame is addressed to the beamformee station and one or more other beamformee stations, wherein the CBF/CQI frame is wirelessly transmitted to the beamformer station simultaneously with one or more CBF/CQI frames transmitted by the one or more other beamformee stations in response to the BFRP trigger frame.

16. The method of claim 10, further comprising:
responsive to determining that the NDP announcement frame includes an indication that the beamformee station should acknowledge the NDP announcement frame, wirelessly transmitting an acknowledgement frame for the NDP announcement frame to the beamformer station in the first frequency band.

17. A wireless device to function as a beamformee station in a wireless network, the wireless device comprising:
a radio frequency transceiver;
a memory device storing a set of instructions; and
a processor coupled to the memory device, wherein the set of instructions when executed by the processor causes the beamformee station to:
wirelessly receive, via the radio frequency transceiver, a null data packet (NDP) announcement frame from a beamformer station in a first frequency band, wherein the NDP announcement frame includes a sounding dialog token field where bits B0 and B1 of the sounding token field are set to binary '1' to indicate the NDP announcement frame should be processed as an extremely high throughput (EHT) NDP announcement frame; and
wirelessly receive, via the radio frequency transceiver, an NDP frame from the beamformer station in a second frequency band in response to receiving the NDP announcement frame from the beamformer station.

18. The wireless device of claim 17, wherein the combination of bit B0 and bit B1 indicates four types of NDP announcement frames.

19. A wireless device to function as a beamformee station in a wireless network, the wireless device comprising:
a radio frequency transceiver;
a memory device storing a set of instructions; and
a processor coupled to the memory device, wherein the set of instructions when executed by the processor causes the beamformee station to:
wirelessly receive, via the radio frequency transceiver, a null data packet (NDP) announcement frame from a beamformer station in a first frequency band and
wirelessly receive, via the radio frequency transceiver, a NDP frame from the beamformer station in a second frequency band after wirelessly receiving the NDP announcement frame from the beamformer station, wherein the second frequency band is different from the first frequency band.

20. The wireless device of claim 19, wherein the set of instructions when executed by the processor further causes the beamformee station to:
wirelessly transmit, via the radio frequency transceiver, a compressed beamforming channel quality indicator (CBF/CQI) frame to the beamformer station in the first frequency band after wirelessly receiving the NDP frame from the beamformer station; and
wirelessly receive, via the radio frequency transceiver, a beamformed data frame from the beamformer station in the second frequency band after wirelessly transmitting the CBF/CQI frame to the beamformer station.

* * * * *